US00RE36161E

United States Patent [19]

Okubo et al.

[11] E Patent Number: Re. 36,161

[45] Reissued Date of Patent: Mar. 23, 1999

[54] DISPLAY PROCESS AND APPARATUS THEREOF INCORPORATING OVERLAPPING OF COLOR FILTERS

[75] Inventors: Yukitoshi Okubo, Yokohama; Yoshiyuki Osada, Atsugi; Masao Sugata; Katsunori Hatanaka, both of Yokohama; Takashi Nakagiri, Tokyo, all of Japan

[73] Assignee: Canon Kabushiki Kaisha, Tokyo, Japan

[21] Appl. No.: 888,791

[22] Filed: Jul. 7, 1997

Related U.S. Patent Documents

Reissue of:

[64] Patent No.: 4,470,667
Issued: Sep. 11, 1984
Appl. No.: 547,443
Filed: Oct. 31, 1983

U.S. Applications:

[63] Continuation of Ser. No. 421,515, Apr. 13, 1995, abandoned, which is a continuation of Ser. No. 246,161, Mar. 23, 1981, abandoned.

[30] Foreign Application Priority Data

| | | | |
|---|---|---|---|
| Apr. 1, 1980 | [JP] | Japan | 55-43101 |
| Apr. 2, 1980 | [JP] | Japan | 55-44461 |
| Apr. 8, 1980 | [JP] | Japan | 55-45941 |
| May 19, 1980 | [JP] | Japan | 55-66238 |

[51] Int. Cl.[6] ..... G02F 1/133

[52] U.S. Cl. ..... 349/42; 349/106; 349/110; 349/132; 349/138; 349/162

[58] Field of Search ..... 359/67, 68, 81, 359/59, 58; 349/42, 106, 110, 132, 138, 162

[56] References Cited

U.S. PATENT DOCUMENTS

| | | | |
|---|---|---|---|
| 3,840,695 | 10/1974 | Fisher | 359/273 |
| 3,863,332 | 2/1975 | Leupp et al. | 359/69 |
| 3,864,022 | 2/1975 | Moriyama et al. | 359/78 |
| 3,960,750 | 6/1976 | Moriyama et al. | 252/299.1 |

(List continued on next page.)

FOREIGN PATENT DOCUMENTS

| | | |
|---|---|---|
| 55-43101 | 4/1980 | Japan . |
| 55-44461 | 4/1980 | Japan . |
| 55-45941 | 4/1980 | Japan . |
| 55-66238 | 5/1980 | Japan . |

OTHER PUBLICATIONS

Hayama et al., "Amorphous–Silicon Thin–Film Metal–Oxide–Semiconductor Transistors", Appl. Phys. Lett., vol. 36, No. 9, May 1, 1980, pp. 752, 755.

(List continued on next page.)

*Primary Examiner*—William L. Sikes
*Assistant Examiner*—Kenneth A. Parker
*Attorney, Agent, or Firm*—Fitzpatrick, Cella, Harper & Scinto

[57] ABSTRACT

A display apparatus comprises a first substrate provided with a thin film transistor array as a driving switching element and a second substrate provided with another electrode, and produces a display by electro-optical change generated between these substrates. Visibility of the display is improved in such a way that rays of light incident on the display apparatus are converted into diffusion light. Photoconductive material, in particular amorphous silicon, can be used by covering semiconductive portions of the thin film transistor array of the display apparatus with an intercepting member. In a display apparatus using a thin film transistor array as a driving switching element, a conductive surface electrically insulated from gate lines on a substrate on where the gate lines for the thin film transistor array are formed, such conductive surface acts as a counter electrode of capacitors for storing charge. Therefore the counter electrode of capacitors is separately formed from gate lines, and writing driving voltage can be set without taking effects of voltage change of gate lines into consideration. Shading layers comprising a plurality of color filters also cover each of the thin film transistors.

123 Claims, 11 Drawing Sheets

U.S. PATENT DOCUMENTS

| | | | |
|---|---|---|---|
| 4,165,922 | 8/1979 | Morrissy | 359/84 |
| 4,213,676 | 7/1980 | Kaufmann | 437/187 |
| 4,294,524 | 10/1981 | Stolov | 359/68 |
| 4,304,465 | 12/1981 | Diaz | 348/761 |
| 4,389,096 | 6/1983 | Hovi et al. | 359/68 |
| 4,410,687 | 10/1983 | Stolov et al. | 359/68 |

OTHER PUBLICATIONS

Brody, "Integrated Electrooptic Displays", Nonemissive Electrooptic Displays, Penum Press, N.Y., 1976, pp. 303–341.

The Transactions of the Institute of Electronics and Communication Engineers of Japan, vol. J63–C, No. 2, pp. 128–129, "Amorphous Silicon Thin Film MOS Transistor," Feb. 1980.

Proceedings of the National Conference of the Institute of Electronics and Communication Engineers of Japan, 2nd vol., pp. 281–282, "a–Si p–Channel FET;" pp. 285–286, Switching Characteristic of a–Si FET, pp. 287–288, a–Si FET IC on Glass Substrate, Mar. 1980.

Proceedings of the 26th Joint Conference relating to the Japan Society of Applied Physics, p. 326, "a–Si Thin Film MOS Transistor," Mar. 1979.

DISPLAY PROCESS AND APPARATUS THEREOF INCORPORATING OVERLAPPING OF COLOR FILTERS

Matter enclosed in heavy brackets [ ] appears in the original patent but forms no part of this reissue specification; matter printed in italics indicates the additions made by reissue.

This *application is a continuation of application Ser. No. 08/421,515 filed Apr. 13, 1995, now abandoned, which is a reissue application of application Ser. No. 06/547,443, now U.S. Pat. No. 4,470,667, issued Sep. 11, 1984, which* application is a continuation of application Ser. No. 246,161 filed Mar. 23, 1981 now abandoned.

BACKGROUND OF THE INVENTION

1. Field of the Invention

The present invention relates to a display apparatus using a driving circuit substrate comprising a thin film transistor array and, in particular, to a transistor array suitable for the purpose that amorphous silicon is used as a semiconductor.

2. Description of the Prior Art

There is disclosed a display apparatus using a thin film transistor array as a driving switching element, for example, in U.S. Pat. No. 3,824,003 and 3,840,695, and "IEEE Transactions on Electron Device" Vol. Ed-20, No. 11 (November 1973), pp. 995–1001, etc. The display apparatus described in U.S. Pat. No. 3,824,003 is a display apparatus of the reflection type, in which liquid crystal is used as display means. Drain electrodes becoming picture elements are made of metal of high reflectivity such as Al and the like to act as a reflective plate.

The dynamic scattering effect has been conventionally employed to discriminate electro-optic change operating in such apparatus. There are recently used various liquid crystal operating modes exhibiting a field-effect. Examples of such relatively new modes are the twisted nematic mode (TN mode), the deformation of vertical aligned phases mode (DAP mode) using double refractionarity, the hybrid aligned mode (HAN mode), and the modified modes in which the above-mentioned modes are accompanied by the Guest-Host effect that the operation of the liquid crystal is readily discriminated in such a way that dichromic dyes are added in the liquid crystal. Such modes are disclosed in "Recent Display Apparatus" (Nippon Hoso Press Kyokai, 1974). In conventional apparatus, it is predicted that the above-mentioned modes may be optionally selected. However, when the present inventors investigated the display effect of such field-effect liquid crystals, they could not find an operating mode in which a sufficient indication effect can be obtained, in the conventional structures. It was found that the cause of the above-mentioned fact is based upon using electrodes with metallic mirror surfaces, which are also drain electrodes, as electrodes for display elements. The drawbacks of the mirror surface structure include action of the surface as a mirror in a transparent light view field upon view of the display, and therefore the optical change of the display is simultaneously seen with image of a background projected on the mirror surface. In other words, the background varies depending upon where the display apparatus is located, for example. The display surface is dark in the case of a dark background. However, the mirror surface structure results in formation of mirror images of light sources located on the ceiling or a face of an observer on the display surface, and therefore reading change of the display in sometimes difficult.

On the other hand, there is known a display apparatus using the above-mentioned dynamic scattering effect and having a display structure capable of being seen easily, in displays using conventional mirror surface metals. In this display apparatus, a liquid crystal cell is transparent when voltage is not applied, but the liquid crystal assumes the scattering state upon application of a voltage. A display apparatus is used in which a black background is located in the normally reflecting direction of the mirror surface of the display apparatus toward the viewing direction. In this display apparatus, rays of light incident on the display apparatus from surroundings, except for the normally reflecting direction, is scattered by the display portions (liquid crystal cell) when voltage is applied, so that an observer sees the scattering light. The observer sees the black background on transparent display portions when voltage is not applied, so that contrast between both portions is high. The primary drawback of the above-mentioned conventional structure is lack of reliability in comparison with the foregoing field effect mode, since the dynamic scattering effect consumes slight electric current. Second, the display tends to become dark, since light is not incident from the background portion on account of the black background. Further, the display using the dynamic scattering effect requires voltage higher than those of the foregoing other modes of the field effect type.

In conventional display apparatus, a coating alone has been used on a portion of a semiconductor layer where a liquid crystal material contacts for the purpose of enhancing stability of a thin film transistor, and preventing undesirable electrochemical reaction between exposed portions of the liquid crystal material and the semiconductor layer. The materials which can be used for this purpose are calcium fluoride, a film of silicon dioxide, and quartz. However, in case that amorphous silicon having excellent transistor characteristics is used, such protective coating is functionally insufficient to eliminate effects on photoconductive characteristics, and stable operation of the liquid crystal can not be attained. In case that the liquid crystal display is carried out by the field effect, it is not required that the surface of a drain electrode to be a display element unit contact with the liquid crystal. On the contrary, it is desirable that the surface of the drain electrode be covered with a transparent insulating film and for this reason the conventional structure is undesirable. Further, it is required that the liquid crystal molecules in a liquid crystal cell of the field effect type, be uniformly oriented. In other words, a treatment is required for obtaining a uniform surface of the liquid crystal. In view of this treatment, the conventional display structure has not been satisfactory.

For effecting display by using the conventional display apparatus, an electric field is generated between a selected drain electrode (display electrode) and a counter electrode in such a way that an image signal is applied to a gate line with scanning, and with a driving voltage to a source line. In this case, the display is carried out in such a way that an electro-optical change of the liquid crystal is read by detecting means such as a polarizing plate or the like.

The display apparatus can be driven by a line-sequential system with a driving voltage sequentially supplied with scanning. When a time (frame time) displaying a frame is constant, address time becomes shorter for each image element with an increase in the number of gate lines. Accordingly, if enhancement in resolving power of a picture is designed by increasing the number of gate lines, scanning time can not be faster than the response time of the display means such as a liquid crystal or the like. Otherwise it becomes impossible to carry out normal display. For preventing such a situation, a display process is proposed in which a capacitor is connected in parallel to each picture element, the capacitor stores a driving signal charge in a specified address period, and a driving voltage is continuously applied to each picture element beyond the specified address time. In such display structure, a gate electrode acts as a counter electrode to a drain electrode in the above-mentioned capacitor.

However, when a gate electrode is used as an opposite electrode of a capacitor, a bias voltage equal to a gate signal voltage is applied to the opposite electrode of the capacitor at the specified address time. Consequently, a writing signal is required to be set on the basis of the gate voltage. However, when a transistor assumes the state of high resistance by eliminating the gate voltage, the capacitor shows a voltage different from the drain voltage applied upon writing thereby complicating the action of the apparatus. Such complicated action is disadvantageous and inconvenient for driving a display apparatus by an exact voltage operation. Especially, controlling is difficult in the case of gradation display corresponding to applied voltage.

A display apparatus similar to the above-mentioned display apparatus is described in "IEEE Trans. on Electron Device" Vol. ED-20, No. 11 (November 1973) pp 995–1001. This article shows a structure in which a counter electrode for a storage capacitor is connected with a neighboring gate line.

In a display apparatus comprising the thus constructed display electrode substrate, a capacitor is constructed with a drain electrode and a conductive film facing the drain electrode through an insulating layer. The capacitor is connected to a gate line of a noted transistor and a neighboring gate line. Consequently, when the transistor is driven, gate voltage is alone applied to one gate line, and the other gate line is grounded. In the case of such driving process, a signal of a source line is applied to ground potential. Therefore, it becomes easy that an operating voltage of more than that of the apparatus disclosed in U.S. Pat. No. 3,824,003 is applied to a display medium. However, in this case, when a signal is applied to a gate line, the potential of a drain electrode changes depending upon the voltage condition of the gate line, so that there is the possibility that display is affected.

In U.S. Pat. No. 3,840,695, there is disclosed a process effecting color display, in which color mosaic filters as shown in FIGS. 2(10) and 3(36) of the above-mentioned patent specification are used as the above-mentioned switching elements for drive in a display apparatus using thin film transistors.

In the conventional apparatus, parts having optical functions are assembled into a display apparatus. In such structure, there is a disadvantage that the number of steps increases since an independent step for preparing a filter is added to the conventional steps for preparing a display apparatus. When such filter is mounted on an external surface of a substrate of a display apparatus as shown in FIG. 2(10) of the above-mentioned patent, the mosaic filter is separated from a display element portion generating an optical change between opposite substrates in an amount of the thickness of the substrate. Therefore, parallax is caused when the display is seen obliquely.

SUMMARY OF THE INVENTION

It is an object of the present invention to provide a novel display apparatus capable of eliminating various drawbacks of above-mentioned conventional display apparatus.

It is another object of the present invention to provide a display process decreasing the viewing difficulty in the case of using an electrode having a metallic mirror surface, and an apparatus for practicing the process.

It is further object of the present invention to provide a display process capable of effecting a color display, and an apparatus thereof.

It is still further object of the present invention to provide a display apparatus comprising a light diffusion plate having a function of protecting the surface of the display apparatus without a hood.

It is still another object of the present invention to provide a display process in which an observer can set a light diffusion plate at any angle for obtaining desirable display effects, or view the display by removing the diffusion plate in a situation where good scattering background exists, and an apparatus thereof.

It is a still further object of the present invention to provide a display apparatus which comprises a thin film transistor array having an improved driving stability.

It is a still further object of the present invention to provide a display apparatus capable of using amorphous silicon.

It is still further object of the present invention to provide a display apparatus capable of effecting easily exact control of operating voltage without influence resulting from voltage of gate lines, and therefore providing a stable display.

It is a still further object of the present invention to provide a display apparatus prepared easily.

According to one aspect of the present invention, there is provided a display process implemented with a display apparatus using a transistor array as a driving switching element, characterized in that electro-optical change generated between an electrode having metallic mirror surface and another transparent electrode is discriminated by scattering light which is obtained by scattering rays of light incident on said display apparatus.

According to another aspect of the present invention, there is provided a display apparatus characterized in that at least one polarizing plate is arrayed in a light path for observing electro-optical change of the display apparatus in which a liquid crystal dissolving dichromic dye is sandwiched between electrodes provided by a transistor array and a counter electrode, and in that light incident on the display apparatus is diffusion light.

According to a further aspect of the present invention, there is provided a display apparatus comprising a first substrate provided with a thin film transistor array; having plural electrodes, as a driving switching element and a second substrate provided with another electrode. Display is effected by electro-optical change generated between these substrates.

According to still another aspect of the present invention, there is provided a display apparatus comprising a first substrate provided with a thin film transistor array having a plural number of electrodes and comprising a display element unit and a second substrate provided with another electrode, and an electro-optical material sandwiched between the substrates, characterized in that color optical filters are arranged relative to each electrode of said thin film transistor, adjacent filters having different spectral characteristics from each other, and each of the adjacent filters overlapping at adjacent end thereof.

According to a still further aspect of the present invention, there is provided a display apparatus using a thin film transistor array as driving switching elements, characterized in that a conductive surface is formed electrically insulated from gate lines on a substrate on which said gate lines for said thin film transistor array are formed.

DESCRIPTION OF THE PREFERRED EMBODIMENTS

Figure 1:
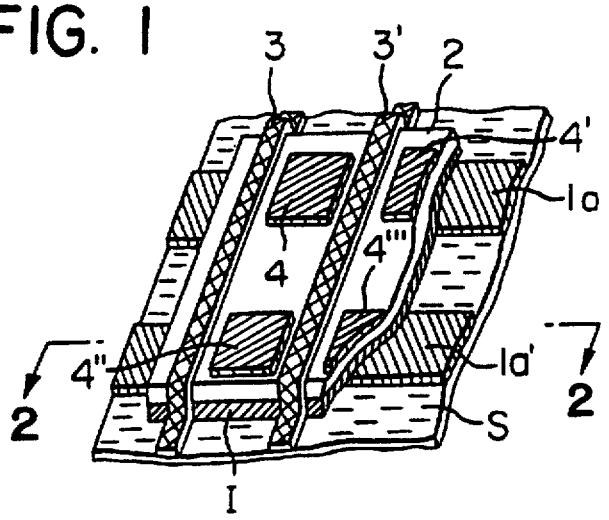
FIG. 1 shows a perspective view of an electrode covered with a thin-film transistor.

FIG. 1 shows a substrate in which thin film transistors (hereinafter, "TFT") are disposed in a density of about 2–10 lines/mm in a matrix on a substrate such as glass or the like forming a panel for a display. The TFT comprise gate lines 1a and 1a' (made of transparent or metallic thin conductive films) formed on the substrate S, a semiconductor 2 in a form of thin film formed on the gate electrodes through an insulative film I, source lines 3 and 3' (made of conductive films formed in contact with the semiconductor) and drain electrodes 4, 4', 4" and 4'" facing the source lines, which intersect at right angles to the gate lines, with a slight gap and the like.

Figure 2:
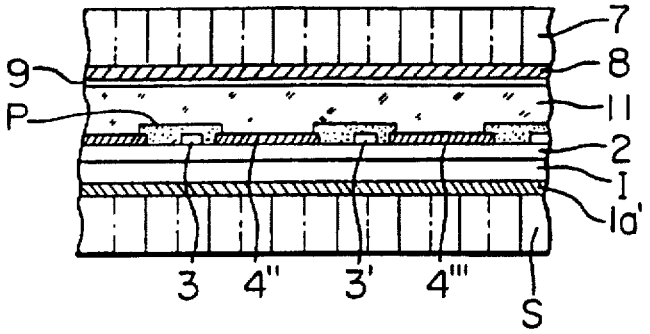
FIG. 2 shows cross section of a display device utilizing the electrode covered with thin-film transistor.

FIG. 2 shows a liquid crystal display apparatus constructed by an expanded sectional view taken along line AA' in FIG. 1 and a counter substrate. In FIG. 2, reference characters 7 and S represent substrates of glass, 4" and 4'" the drain electrodes, 8 a counter electrode. Drain electrodes 4" and 4'" are made of metallic thin films such as Au, Al, Pd or the like. Electrode 8 is made of a transparent conductive film such as $In_2O_3$, $SnO_2$, or the like. Numerals 1a and 1a', and 3 and 3' represent gate electrodes and source lines, respectively. These are made of metals such as Al, Au, Ag, Pt, Pd, Cu, or the like. Numeral 9 represents an insulating film which is utilized, if necessary. Reference character SC represents a semiconductor such as CdS, CdSe, and the like. Reference character P represents a protecting layer of calcium fluoride plus silicon dioxide or quartz Reference numeral 11 represents a liquid crystal layer. In display apparatus, various states of orientation of liquid crystal molecules, and various optical detecting means such as polarizing plate, $\lambda/4$ plate, reflection plate or the like may be optionally selected depending upon a display mode selected, for example, dynamic scattering mode (DSM), twisted nematic (TN) or the like or the type of apparatus, for example, a transparent type, a reflection type or the like.

The driving method is, in general, as described below.

For example image signals are applied to gate lines 1a, 1a', and driving voltages are applied to source lines 3, 3' by scanning (only while a signal is applied to the gate line) and thereby, the channel between source 3, 3' and drain 4", 4'" becomes conductive at the selected intersection. And there is formed an electric field between the drain electrode and the counter electrode 8 and arrangement of liquid crystal molecules in liquid crystal layer 11 changes to effect display. In other words, the display apparatus can be driven by a line-sequential system.

The dynamic scattering effect has been conventionally employed to discriminate electro-optic change in such apparatus. There are recently used various liquid crystal operating modes exhibiting a field-effect. Examples of such relatively new modes are the twisted nematic mode (TN mode), the deformation of vertical aligned phase mode (DAP mode) using double refractionarity, the hybrid aligned mode (HAN mode), and the modified modes in which any of the above-mentioned modes are accompanied by Guest-Host effect the operation of the liquid crystal is readily discriminated in such a way that dichromic dyes are added in the liquid crystal. Such modes are disclosed in "Recent Display Apparatus" (Nippon Hoso Press Kyokai, 1974).

Figure 9A:
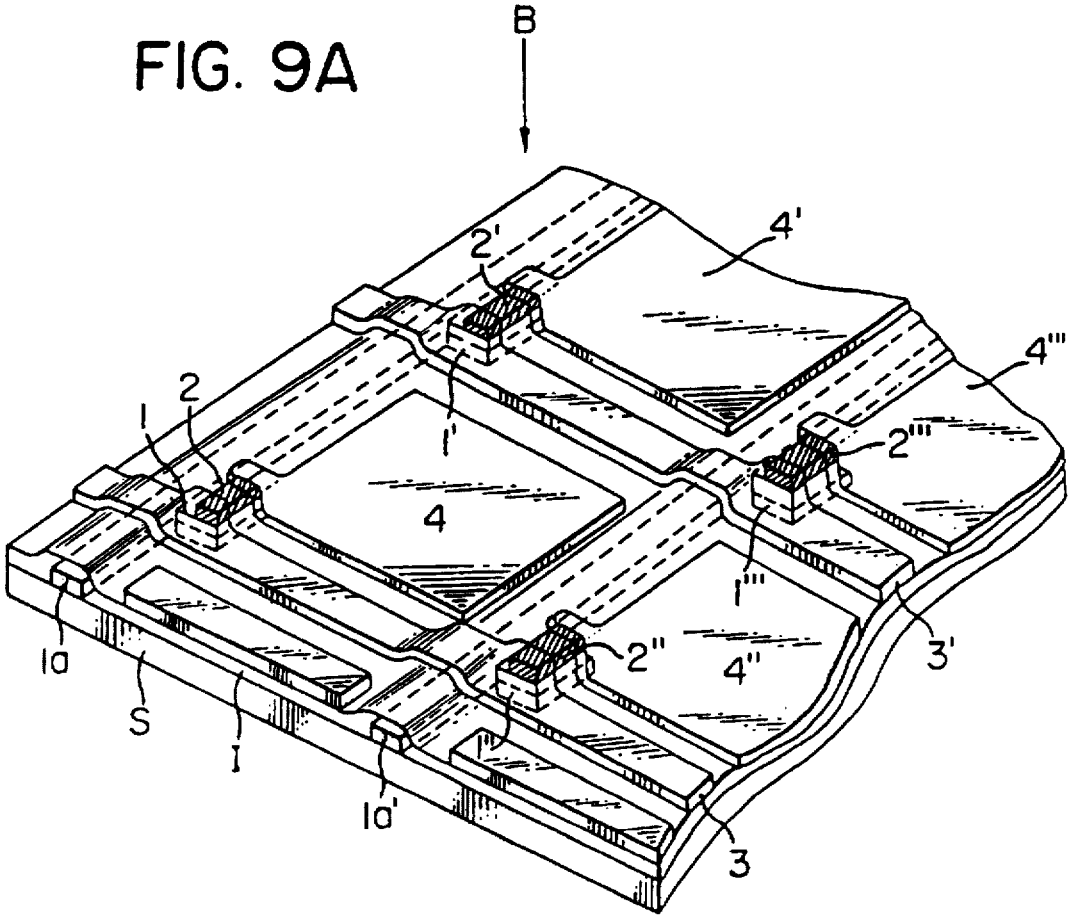
FIG. 9A shows perspective view of an electrode covered with a thin-film transistor.
Figure 9B:
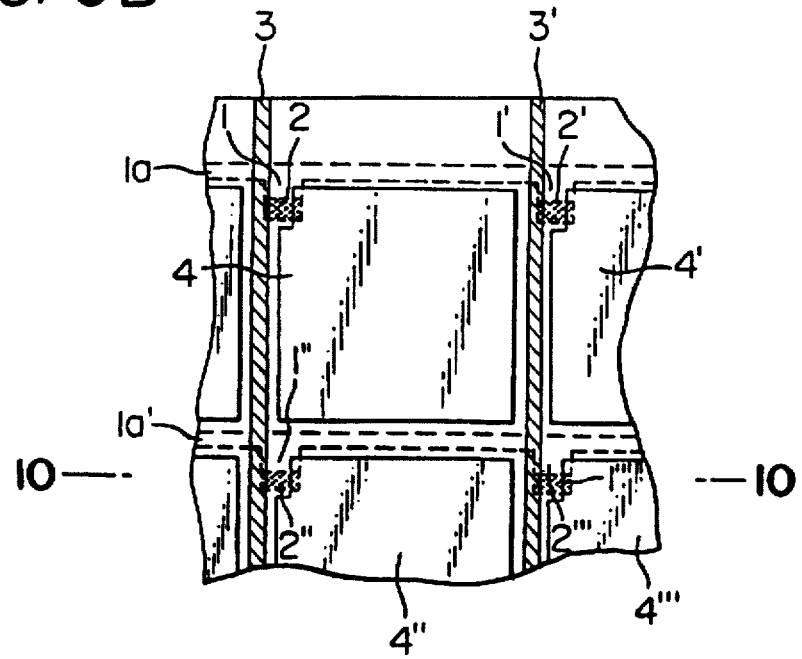
FIG. 9B shows a plan of an electrode covered with thin-film transistor.

FIG. 9A shows an embodiment in which TFT are disposed in a density of about 2–10 lines/mm in a matrix on a substrate such as glass or the like forming a panel for a display. The TFT, comprise gate lines 1a and 1a' (made of transparent or metallic thin conductive films) formed on the substrate S, semiconductors 2, 2', 2" and 2'" in a form of thin film formed on the gate electrodes 1, 1', 1" and 1'" through an insulative film I, source lines 3 and 3' (made of conductive films) formed in contact with the semiconductor and drain electrodes 4, 4', 4", and 4'" facing the source lines, which intersect at right angles to the gate lines, with a slight gap. FIG. 9B is a plan view from the direction of arrow B in FIG. A, and shows one portion of a matrix driving circuit.

Figure 10:
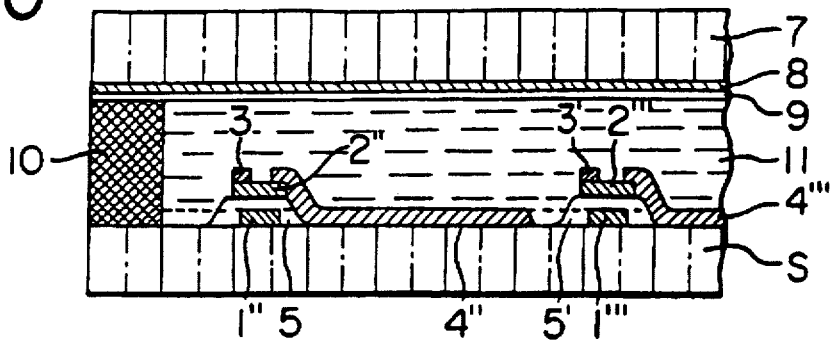
FIG. 10 shows in cross-section of a display device having electrode covered with a thin-film transistor.

FIG. 10 shows a liquid crystal display apparatus constructed by an expanded sectional view taken along line AA' in FIG. 9B assembled with a counter substrate. In FIG. 10, reference characters 7 and S represent substrates of glass, 4" and 4'" the drain electrodes, 8 a counter electrode. Electrodes 4", 4'" and 8 are made of transparent conductive films such as $In_{23}$, $SnO_2$, or the like, or metallic thin films such as Au, Al, Pd, or the like. Numerals 1" and 1'", and 2" and 2'" represent gate electrodes and source lines, respectively. These are made of metals such as Al, Au, Ag, Pt, Pd, Cu, or the like. Numerals 5 and 5' represent insulating films which are specifically formed along one of the gate lines 1a, 1a'. Such forming is a specific embodiment. Numeral 9 represents an insulating film which is used, if necessary. Source lines 2" and 2'" are semiconductors such as CdS, CdSe, Te, amorphous silicon, and the like. Numeral 10 represents a spacer and numeral 11 a liquid crystal layer.

Figure 14:
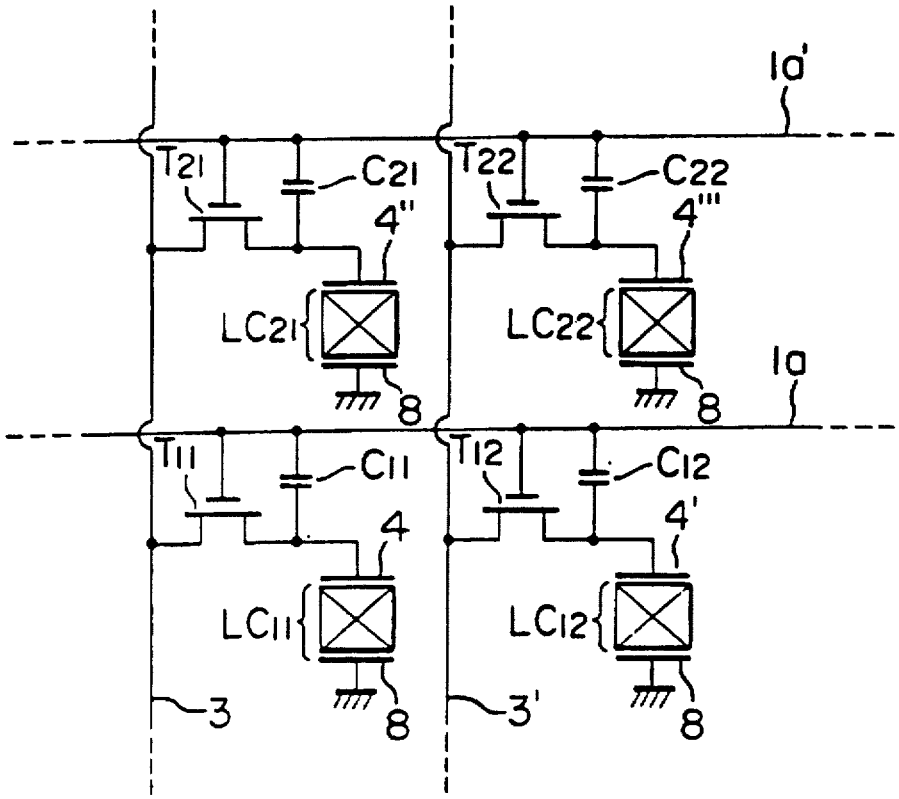
FIG. 14 illustrates a circuit diagram of a display which is equivalent to the one shown on FIG. 2.

FIG. 14 shows an equivalent circuit of the apparatus shown in FIG. 2. In FIG. 14, reference characters $T_{11}$, $T_{12}$, $T_{21}$, $T_{22}$ etc. represent each transistor constructed with the above-mentioned thin film structure, respectively. Reference characters $LC_{11}$, $LC_{12}$, $LC_{21}$, $LC_{22}$, etc. represent the display medium sandwiched between drain electrodes 4, 4', 4", 4'" etc. corresponding to transistors $T_{11}$, $T_{12}$, $T_{21}$, $T_{22}$ etc. respectively, and counter electrodes 8. Numeral 11 represents liquid crystal. Reference characters $C_{11}$, $C_{12}$, $C_{21}$, $C_{22}$ etc. represent capacitors for storage of driving signal charge, which are formed with gate lines 1a, 1a' etc. and drain lines 4, 4', 4", 4'" etc.

Figure 15:
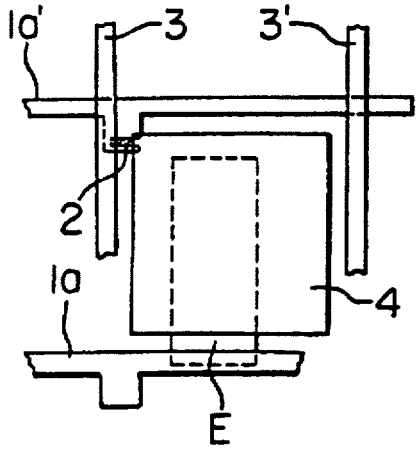
FIG. 15 illustrates a plan of an alternate embodiment of an electrode substrate of a display.
Figure 16:
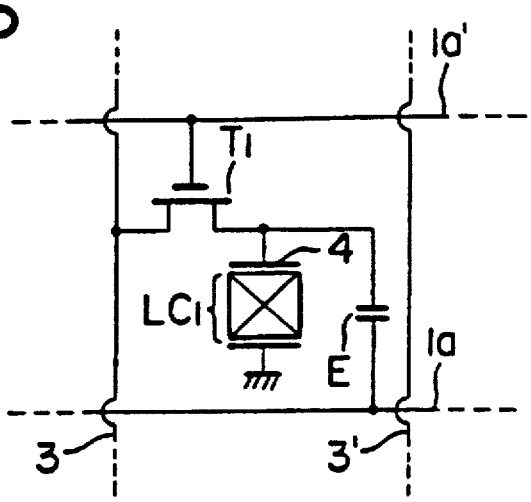
FIG. 16 shows a circuit diagram of a display equivalent to the one in which the electrode substrate of a display on FIG. 15 is utilized.

FIG. 15 is a plan view illustrating a construction of a display electrode substrate used in a display apparatus according to the present invention. FIG. 16 shows an equivalent circuit of a display apparatus constructed by using the display electrode substrate shown in FIG. 15. As shown in FIG. 15, the apparatus gate lines 1a and 1a40 are formed on a substrate (not shown in FIG. 15), and a conductive film E is formed between gate lines 1a and 1a'. In transistors operating on gate line 1a', conductive film E is formed in a manner that most portion of conductive film can be positioned under the surface of drain electrode of the transistor, and electrically connected with gate line 1a neighboring with gate line 1a'. An insulating layer (not shown in FIG. 15) is formed on gate lines 1a and 1a', and conductive film E, and semiconductors 2 are formed on the insulating layer at desired positions above the gate lines 1a and 1a'. As shown in FIGS. 15 and 16, a source line 3 is formed on one end of semiconductor 2, and a drain electrode 4 on the other end of semiconductor 2 to form a thin film transistor $T_1$. For descriptive reason, only one transistor is shown in FIG. 15. However, in practice, plural transistors are formed in an array as the display electrode substrate shown in FIG. 1. Since the apparatus shown in FIG. 15 assumes that a display apparatus of a transmission type is formed, semiconductor 2 is separately formed corresponding to each transistor so that semiconductor 2 is absent under drain electrode 4. However, the basic operation of a transistor array is substantially the same as that of the apparatus shown in FIG. 1.

The process of the present invention is effective for improvement for viewing a display apparatus in which the display electrode substrate, in particular the drain electrode, is made of mirror surface metal such as Al, Au, Ag, Pt, Pd, Cu, or the like.

Figure 3A:
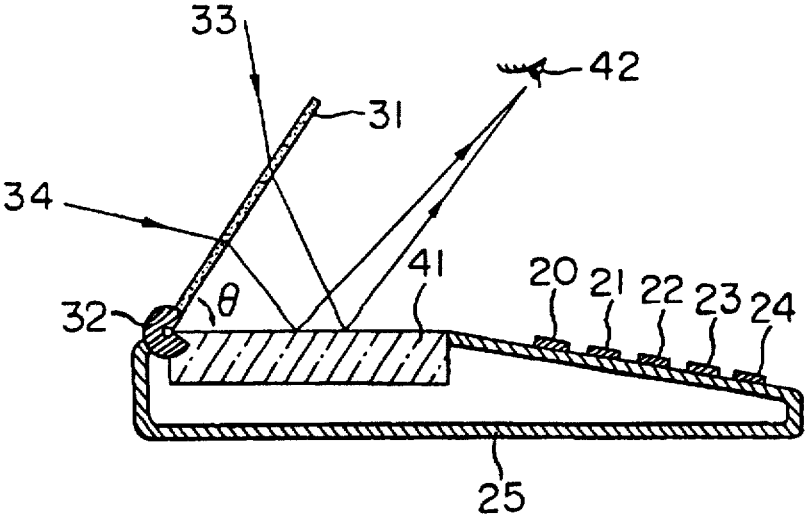
FIGS. 3A, 3B and 3C illustrate the display devices of the present invention in cross section.
Figure 3B:
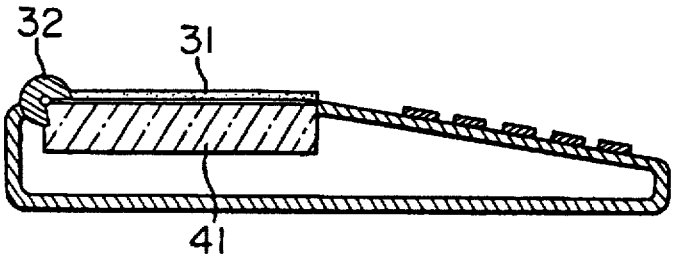
Figure 3C:
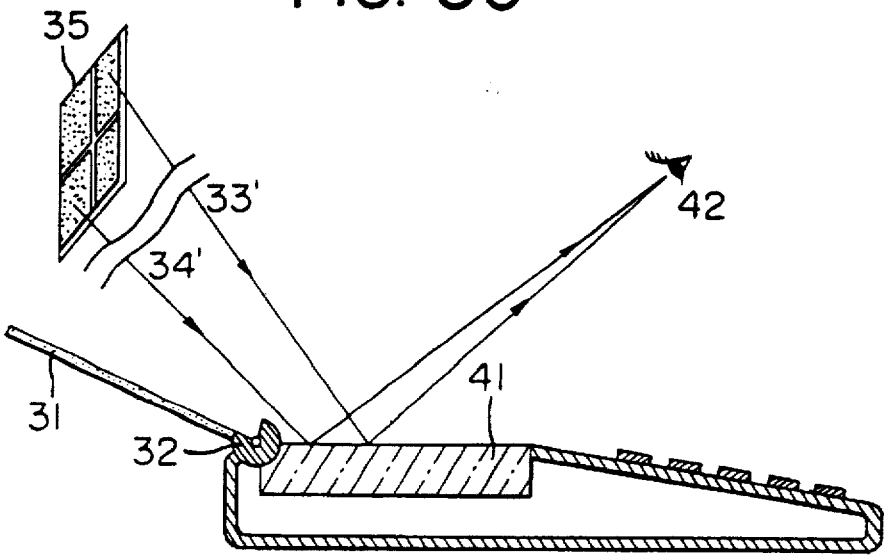
Figure 4:
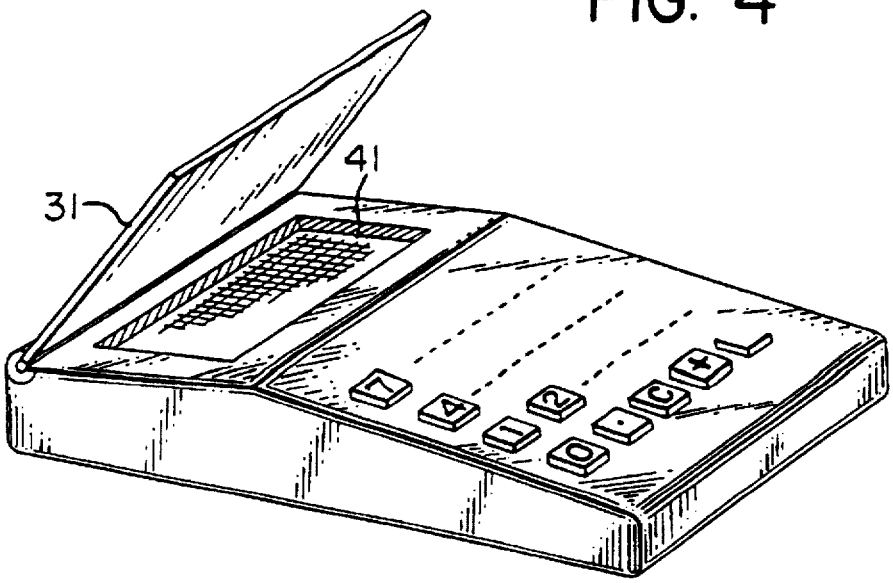
FIG. 4 illustrates a perspective view of a display device of the present invention.

FIGS. 3A, 3B and 3C are views illustrating embodiments according to the present invention. FIG. 3A is a sectional view of a portable apparatus with a display apparatus such as a portable electronic calculator, in which the present invention is applied. Numeral 25 represents a frame body of an apparatus having the above-mentioned display apparatus 41, that includes inside a circuit portion, a power source portion, and the like for operating the apparatus. However, these portions are omitted in the figure. Numerals 20, 21, 22, 23 and 24 represent buttons to operate the apparatus. Numeral 31 represents a light diffusion plate mounted on a background in a direction of normal reflection of a viewer 42 toward a mirror surface of display apparatus 41. Light diffusion plate 31 has an area at least larger than that of display apparatus 41 as shown in FIG. 4. A frame may be suitably mounted in a range larger than the area of display apparatus 41. One end of light diffusion transmission plate 31 is mounted on the frame body by a rotary supporting axis 32. Generally, a hinge may be used as the supporting axis. FIG. 3A, for example, represents a state that incident rays 33 and 34 from a window are projected on light diffusion transmission plate 31, and rays scattered at the plate 31 are further projected on display portion 41, so that a viewer can discriminate the reflected light corresponding to an electro-optical change in the display apparatus 41 using liquid crystal. Additionally, for example, light in a room such as reflected light from a ceiling is also projected on display apparatus 41 as scattered light by light diffusion transmission plate 31 in the same manner as described above, and reaches the viewer 42. Materials of light diffusion transmission plate 31 are not especially restricted, representative examples being films of crystalline polymers, frosted glass, coats supported on transparent supports, in which diffusable fine powder is dispersed in a binder, plastic plates in which diffusable fine power is blended, or the like. FIG. 3B shows a state that light diffusion transmission plate 31 of the present invention is closed on display apparatus 41 as a hood when the apparatus is not used. FIG. 3C shows a state that light diffusion transmission plate 31 is fully opened so that viewer 42 may read electro-optical change of display apparatus 41 by incident rays 33' and 34' through a window 35 when display apparatus 41 is used at a place near frosted glass.

Figure 6:
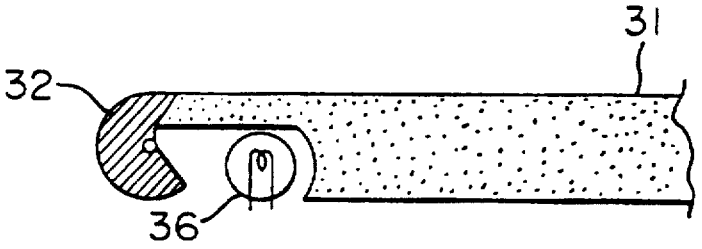
FIG. 6 illustrates an alternate embodiment in cross section.

FIG. 6 shows an embodiment that a tungsten lamp 3 of a fine columnar form is arranged in the neighborhood of a supporting axis 32 of a diffusion plate. In this embodiment when lamp 36 illuminates one end surface of light diffusion transmission plate 31, the light diffusion transmission plate diffuses light and constitutes a scattered secondary light source. This embodiment is effective in a dark place or at night.

Figure 5:
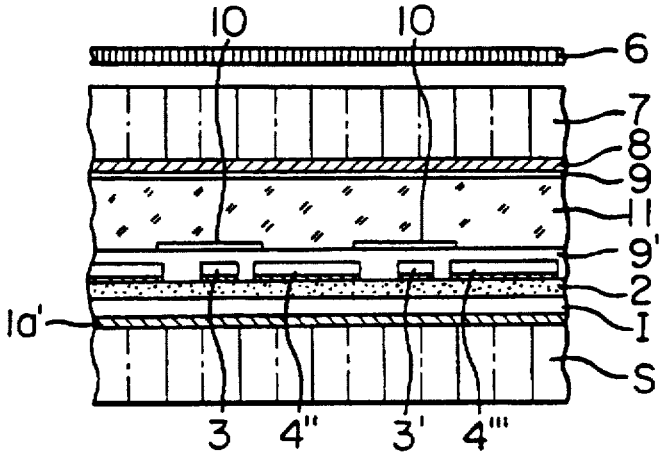
FIG. 5 shows a cross section of a display device.

A display apparatus 41 may be constructed as shown in FIG. 5.

FIG. 5 is a partial sectional view showing a concrete embodiment of a display apparatus 41. In FIG. 5, elements common with those of FIGS. 1 and 2 are represented by the same symbols. The display apparatus 41 is effective in case that CdS, CdSe, Te, or, in particularly, amorphous silicon is used. In the structure according to the present invention, a $n^+$ layer is formed on a surface of semiconductors 2 in such a way that the semiconductors are in ohmic contact with source electrodes (3, 3' . . . ) and drain electrodes (4", 4'" . . . ). This structure provides stable operation of the TFT and uniform characteristics. And, for operating stability of display, insulating layer 9' coats on a surface formed by a driving circuit portion of the semiconductor, drain electrodes, and source electrodes. The insulating layer functions as a non-active layer for preventing contamination by impurities into the semiconductor portion, and electrochemical reaction caused by direct contact of drain electrodes with liquid crystal. Further, the insulating layer functions as base layer having uniform quality so as to orient uniformly liquid crystal on the base. $SiO_2$, $Al_2O_3$, and $SiN_3$ may be preferably used as the material of the insulating layer 9', and other metallic oxide, or fluoride may be used. Further, in the present invention, an intercepting film 10 coats on portions where light can be transmitted on the semiconductor portion for avoiding improper operation or unstable operation caused by photoconductivity of the semiconductor. Intercepting film 10 can be formed with a film of metals which can be easily formed, and with which patterning is easy. When the same metal as that for drain electrodes 4" and 4'" is used as the metal to form intercepting film 10, it is possible to obtain apparent continuity and optical unformity. In other words, when a film of metal such as Au, Al, Pd, or the like is used for drain electrodes 4" and 4'", Au, Al or Pd to be same as the metallic film can be selected as a metal of intercepting film 10.

There is another embodiment of the present invention, in which intercepting film 10 is made of a metal different from that of display element electrodes 4" and 4'" in optical characteristics, for the purpose of color effect and enhancing contrast of display. In other words, when Al is used for display element electrodes 4" and 4'", Au or Cu may be used for intercepting film 10. In a still another embodiment of the present invention, a film containing organic dye or pigment can be used as intercepting film 10. Such organic materials generally contain a large amount of impurity. However, using such materials, the present invention has a great advantage that affect to the semiconductor can be avoided by non-active layer of the base. Further, this embodiment has the great advantage that a non-displayed portion can be obtained as colored background. In other words, any colored background can be selected, and any color effect can be obtained in the display. In case that the non-displayed portion is black, there is an advantage that apparent enhancement of contrast can be obtained by contrast between non-displayed and displayed portions. Organic dye or pigment to be used for the non-displayed portion is not, in particularly, limited. Representative examples are as follows.

As black materials: organic pigments such as diamond black (C.I. 50440), or the like, and dyes such as Cellitazol STN (Disperse Black, C.I. 11365, supplied by BASF), Latyl Diazoblack B (Disperse Black, C.I. 11365 supplied by E. I. du Pont de Nemours & Co., Inc.), Cibacet Diazoblack B (Disperse Black, C.I. 11255, supplied by Ciba-Geigy Ltd.), Miketazol Black GF (C.I., Disperse Black 28, supplied by Mitsui-Toatsu Chemicals Inc.), Kayacryl Black BD (C.I., Basic Black 10(S), supplied by Nippon Kayaku Co., Ltd.), Suminol Fast Black BR. conc. (C.I., Acid Black 31, supplied by Sumitomo Chemical Co., Ltd.), Diacelliton Fast Black T (Disperse Black 1, C.I., 11365, supplied by Mitsubishi Chemical Industrial Co., Ltd.), Miketazol Black 3GF (C.I., Disperse Black 29, supplied by Mitsui-Toatsu Chemicals Inc.), Kayalon Diazo Black 2GF (C.I., Disperse Black 29, supplied by Nippon Kayaku Co., Ltd.), Aizen Opal Black WGH (C.I., Acid Black 52, supplied by Hodogaya Chemical Co., Ltd.), or the like.

Liquid crystal showing a field effect may be preferably used for the apparatus of the present invention. In the case of using such liquid crystal, the surface of a substrate is subjected to treatment for orientation. For this treatment, material uniformity and flatness of surface material for the substrate are very important. In the present invention, such base for orientation can be obtained by selecting a suitable insulating layer 9'.

In general, silicon dioxide is a representative material of base layer for orientation. Other metal oxides to be optically transparent may be selected. Such metal oxides are aluminum oxide ($Al_2O_3$), titanium dioxide ($TiO_2$), SiO, and the like. Halogenide such as $MgF_2$ and $CaF_2$, and $Si_2N_3$ may be used for the coating. Orientation treatment on such surface may be oppositionally selected from processes such as a process in which insulating layer 9' is formed by an oblique vacuum deposition process, a process in which treatment is carried out by using an agent for homeotropic or homogeneous orientation, a process in which treatment is carried out by combining the above-mentioned processes, and a process in which a base for orientation is obtained by rubbing in a constant direction. Such treatment is also carried out on the surface of counter insulating layer 9. Liquid crystal 11 is sandwiched between two substrates having surfaces for orientation separated at the periphery by a spacer.

A still further effect of the structure according to the present invention can be obtained in manufacturing steps. By reference to FIGS. 7A through 7H, manufacturing steps of a TFT substrate according to the present invention will be described.

Figure 7A:
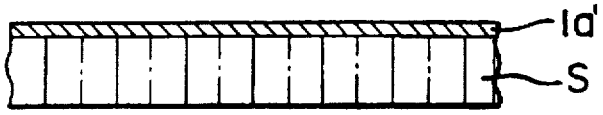
FIGS. 7A to 7H illustrate flow diagrams for preparation of a substrate composed of a thin-film transistor of the present invention.
Figure 7B:
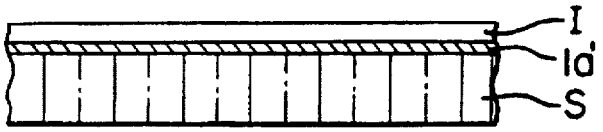
Figure 7C:
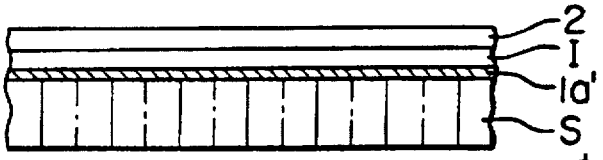
Figure 7D:
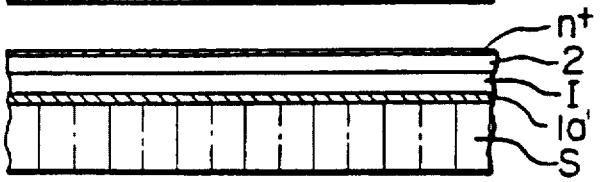
Figure 7E:
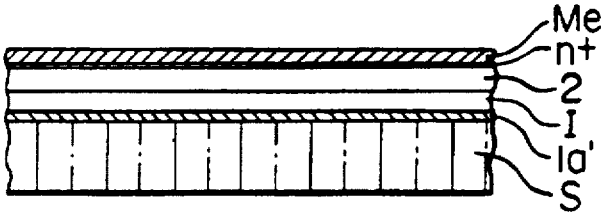
Figure 7F:
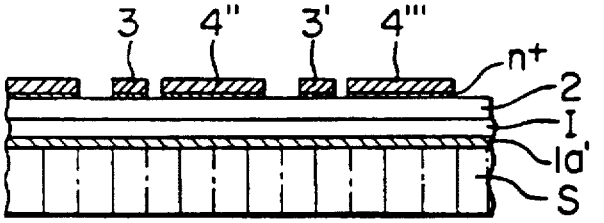
Figure 7G:
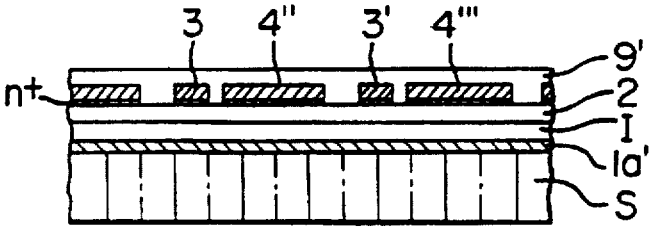
Figure 7H:
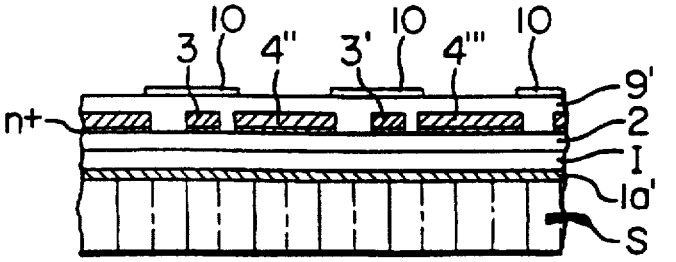

The surface of a substrate S, such as glass, is cleaned and metal is deposited for forming gates. This metal is formed in plural stripes by a photolithography process. Numeral 1a' of FIG. 7A shows a sectional view taken in a direction in which the stripes extend. Aluminum is a representative material of this electrode. In FIG. 7B, an insulating layer is formed on a whole surface containing gate electrodes 1a' (1a, 1a" . . . ). Sequently, semiconductor 2 is formed on the whole surface as shown in FIG. 7C. Further a $n^+$ layer is formed as shown in FIG. 7D. Immediately thereafter, a metallic film Me is formed on the whole surface as shown in FIG. 7E. Next, by etching the metallic film and the $n^+$ layer in photolithographic process plural source electrodes 3, 3' . . . of stripes and plural drain electrode 4", 4'" . . . are formed in the direction perpendicularly intersecting the lower gate electrodes as shown in FIG. 7F. Further, insulating layer 9' is formed on the whole surface as shown in FIG. 7G. Finally, intercepting members 10 are formed in a region except for the display element.

Using amorphous silicon as a semiconductor, the present invention exhibits advantageous effects. As is well known, affects of impurity should be mitigated in the manufacturing steps. In the manufacturing steps employed in the present invention, since steps described in FIGS. 7B through 7D, or 7B through 7E are conducted steps continuously, the semiconductor can be formed in a vacuum vessel. A representative example is as described below. When an insulating layer is made of silicon nitride, semiconductor amorphous silicon, and an $n^+$ layer amorphous silicon doped with phosphorus, arsenic, or the like, these materials can be continuously decomposed by glow discharged in one vacuum vessel. And a metallic film to be formed on the above-mentioned layer can be formed by another vacuum decomposition process without being subjected to chemical and thermal processes. Such steps are very effective for keeping the surface of the semiconductor in an ideal state. Forming a non-active layer described with reference to FIG. 7G immediately after forming a pattern described with reference to FIG. 7F is effective for keeping stably the thus manufactured semiconductor portion against chemical and thermal processes to be carried out after that. As already described, the non-active layer increases freedom of selecting material for an intercepting member described as the step of FIG. 7H, and reduces the limitation of selecting a process in orientation treatment subsequent to the step described in FIG. 7H. The thus obtained circuit substrate for driving, in a display apparatus discriminating electro-optical change by light from the outside, shows extremely stable operation even when a semiconductor having high photoconductivity is used.

Figure 8:
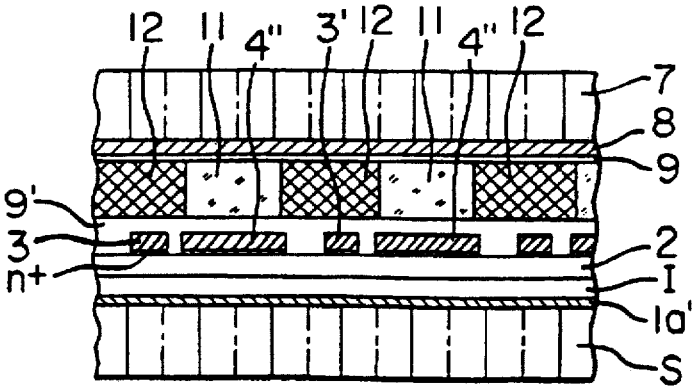
FIG. 8 illustrates still another embodiment of the present invention in cross section.

FIG. 8 shows a modified embodiment of the present invention. In FIG. 8, elements common with those in FIG. 5 are represented by the same symbols. Intercepting member 12 can also be used as a spacer for keeping space between the counter substrates. The intercepting member is obtained by forming the above-mentioned metallic film or pigment to the desired thickness as the spacer. This method is especially effective in case that very thin space of about 1–6 microns between counter substrates is uniformly kept on a large surface of several $cm^2$ to several tens of $cm^2$. This spacing between thin substrates of glass can be realized by such method. In a still further modified embodiment of the present invention, intercepting member 12 can be made of a material such as resin containing dye, pigment, or light absorber having an intercepting property. In such case, such member can be easily prepared by a screen printing process. In a still further modified embodiment of the present invention, an adhesive function is added to member 12.

In case that resin having the intercepting function is one of the hot-melt adhesives, it is possible, in particular, that one electrode is made of plastic film. In other words, a desired thickness at each display element portion can be kept by press-adhesion of one flexible substrate at a circumambient non-display portion for the purpose of keeping constantly a gap between counter substrates at small display element portions of several $mm^2$ to several tenths of a $mm^2$. When a thickness in each element portion is kept by such manner, it is possible to produce a display apparatus comprising a number of such elements and having a substantial, large area. Deformation resulting from waving motion of surfaces of the substrates can be mitigated. Thermosetting resin can be used instead of the hot-melt adhesives.

A circular dot pattern can be obtained by a still further modification of the present invention, in which the area of intercepting member 12 is expanded to a part capable of display beyond a non-display portion to obtain a circular window on a display element. Display effects can also be enhanced by the intercepting member in any other form.

The display apparatus of the present invention is of the mirror surface reflection type, since display element electrodes are made of metallic film. Consequently, an optical arrangement is selected to make the display apparatus of the present invention easy to see.

An embodiment of a display apparatus having mirror surface reflecting structure is one having a scattering light source in a position of normal reflection to a viewer. Both a liquid crystal of Np having positive dielectric anisotropy and a liquid crystal of Nn having negative dielectric anistropy can be used. However, these liquid crystals are operated by the field effect in the present invention. In particularly, it is effective to use liquid crystal in which dichromic dye is added.

A polarizing plate 6, for example, as shown in FIG. 5, is set on an outside of a substrate having a transparent electrode of a display cell constructed in the above-mentioned manner. It is not always required that polarizing plate 6 be set closely to upper substrate 7 of the display apparatus.

In the present invention, polarizing plate 6 is arranged in such a way that the plate is laminated on the surface facing with display apparatus 41 of light diffusion transmission plate 31. However, it is generally effective that the plate be set on the outside of display apparatus 41. A linearly polarizing plate is generally used. A polarizing direction is set in such a way that optical change becomes maximal in the relation between the alignment direction of dichromic coloring matter and the alignment change resulting from application of voltage. In other words, the maximum absorption state of the coloring matter is obtained when the direction of the major axis of the dichromic coloring matter coincides with the direction of polarized light. Absorption becomes minimum when the direction of the major axis of the dichromic coloring matter is perpendicular to polarizing plate 6. Both combinations produce a change from light to dark and another change from dark to light corresponding to voltage applying and non-applying states and can be obtained by combination of types (Np or Nn) of liquid crystal to be used and an oriented direction in the voltage applying state. In both cases, these display apparatus exhibit strongly mirror surface reflection in a light state. At this point, these display apparatus differ from the display apparatus which exhibits dynamic scattering effect. In a light state, the display apparatus of the present invention provides a light display surface by a light diffusing background resulting from light diffusion transmission plate 31. In a dark state, incident rays are projected into liquid crystal cells so that dye absorbs rays, and reflected on a mirror surface to pass again the liquid crystal cells. In other words, incident rays are absorbed by liquid crystal cells on paths to and from a mirror surface, such that a strong dark state can be obtained to obtain high contrast resulting from the difference between dark and light.

Examples and Comparative Examples of display operation were carried out by using the display apparatus shown in FIG. 3A. The examples and Comparative Examples will be described below.

In the following Table, electro-optic modes were widely varied depending upon types of electro-optical change of the liquid crystal. Example 1 of the present invention is of TNGH mode (the twisted nematic mode (TN) accompanied by the Guest-Host effect (GH)). Dye D was added to a liquid crystal Np having positive dielectric anisotropy. The resulting liquid crystal was homogeneously oriented in the direction of an arrow of an upper substrate having a transparent electrode, and in the direction of an arrow of a lower substrate of a mirror surface reflection electrode having TFT shown in FIG. 5 to obtain a liquid crystal cell. In the cell, the liquid crystal is oriented in a twist of about 90° between upper and lower substrates. A polarizing plate was mounted on the outside of the upper substrate of the resulting cell, and the display effect was observed in an optical arrangement ($\theta$=45°) shown in FIG. 3A. In the table, "light" and "dark" represent, respectively, the OFF state when voltage is not applied, and the ON state when voltage is applied to the display apparatus. The display effects obtained at this time are represented by o (excellent), X (bad), and Δ (good), respectively.

The display effect was carried out by a sensual test which is determined by contrast and brightness of a display surface. In Example 2, dye was added to the liquid crystal, and the resulting liquid crystal was aligned in parallel between substrates. In Example 3, liquid crystal is oriented in a manner described below. The principal orientation of the liquid crystal is homeotropical, however the direction where the liquid crystal Nn having negative permittivity falls upon applying voltage is controlled by the subsidiary caused by rubbing the surface of the cell. Thus, the liquid crystal exhibits twisted orientation of about 90° upon applying voltage depending upon the principal and subsidiary orientations. Example 4 is an operation mode in which Nn liquid crystal is homogeneously oriented upon applying voltage.

Comparative Example 1 is same as Example 1 except that the light diffusion transmission plate and a polarizing plate are not used. Comparative Examples 2–4 are same as Examples 2–4 except that the light diffusion transmission plate and the polarizing plate are not used, respectively. Comparative Example 5 is an embodiment using dynamic scattering mode DS. In this case, a black absorber was used as the background of the normal reflection.

The liquid crystals used in the present invention may be selected within wide discretion, while EN-18 (a trade name by Chisso Company) as Nn-liquid crystal, E-7 (trade name by BDH Company) are used under saturated voltage for photoelectrical properties in the following embodiments.

Dyes may be also selected, while it is basically required that they have high solubilities in liquid crystals, high contrast between colors used, good positional order in liquid crystals, high chemical stabilities and preferred color. Following illustrate preferred embodiments.

| Chemical formula of dyes | Color |
|---|---|
| 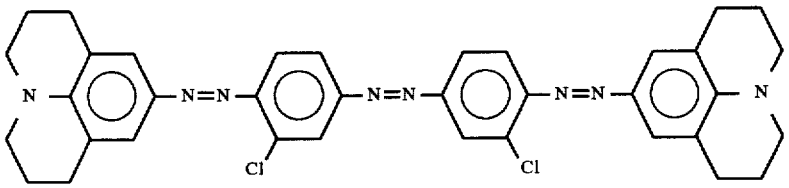 | Cyan |
| 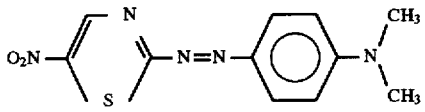 | Cyan |
| 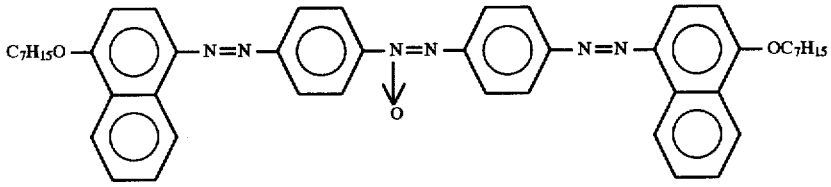 | Magenta |
| 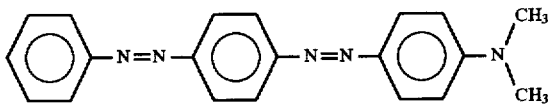 | Orange |
| 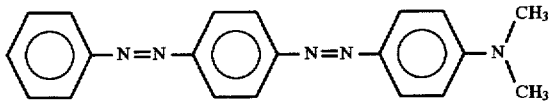 | Megenta |
| 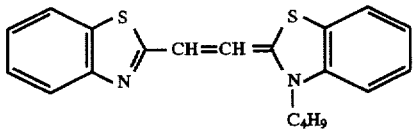 | Yellow |
| 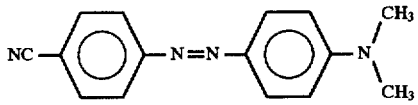 | Yellow |
| 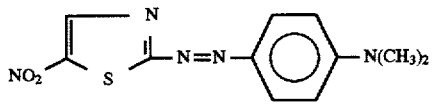 | Blue |
| 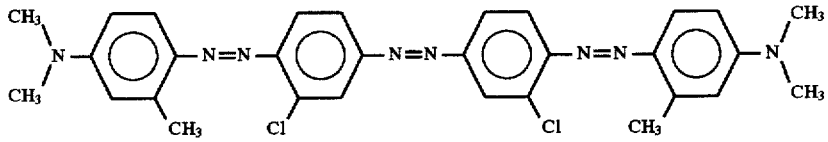 | Purple |

-continued

| Chemical formula of dyes | Color |
|---|---|
| 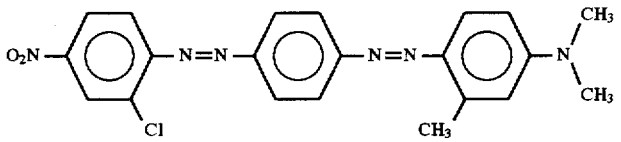 | Purple |

The preferred color display may be obtained by selecting from these dyes.

The examples and comparative examples are shown in the following Table collectively.

| Example Nos. | Electro-optical Mode | Liquid crystals used | Principal orientation (Subsidiary orientation) Upper substrate | Principal orientation (Subsidiary orientation) Lower substrate | Light diffusion transmission plate Polarizing plate | Light/Dark OFF | Light/Dark ON | Display* effect |
|---|---|---|---|---|---|---|---|---|
| No. 1 | TNGH | Np/D | → | ↓ | Yes | dark | light | O |
| No. 2 | NpGH | Np/D | → | ← | Yes | dark | light | O |
| No. 3 | ITNGH | Nn/D | ⊥(→) | ⊥(↓) | Yes | light | dark | O |
| No. 4 | NnGH | Nn/D | ⊥(→) | ⊥(←) | Yes | light | dark | O |
| Comparative Example No. 1 | TNGH | Np/D | → | ↓ | No | dark | light | X |
| Comparative Example No. 2 | NpGH | Np/D | → | ← | No | dark | light | X |
| Comparative Example No. 3 | ITNGH | Nn/D | ⊥(→) | ⊥(↓) | No | light | dark | X |
| Comparative Example No. 4 | NnGH | Nn/D | (⊥→) | ⊥(←) | No | light | dark | X |
| Comparative Example No. 5 | DS | Nn | ⊥ | ⊥ | No | dark | light | Δ |

*O: excellent
X: bad
Δ: good

A display device of the present invention comprises a first substrate composed of a thin-film transistor array having several electrodes as displaying element units, and a second substrate composed of another electrode, and produces a display using electro-optical changes generated between these substrates.

One of the embodiments of the display devices is characterized in that optical color filters may be placed at the electrodes in the said thin-film transistor array, that adjacent filters may possess distinctive spectral properties and that these filters may overlap each other at their peripheral regions.

Figure 11:
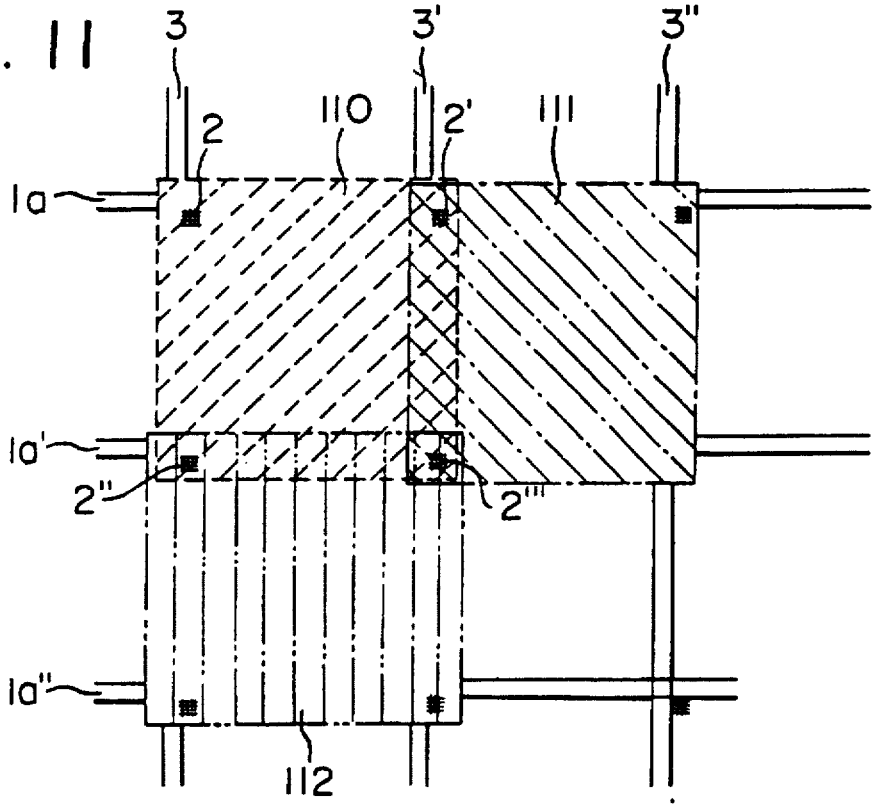
FIG. 11 shows partial plan of an embodiment of the present invention.
Figure 12:
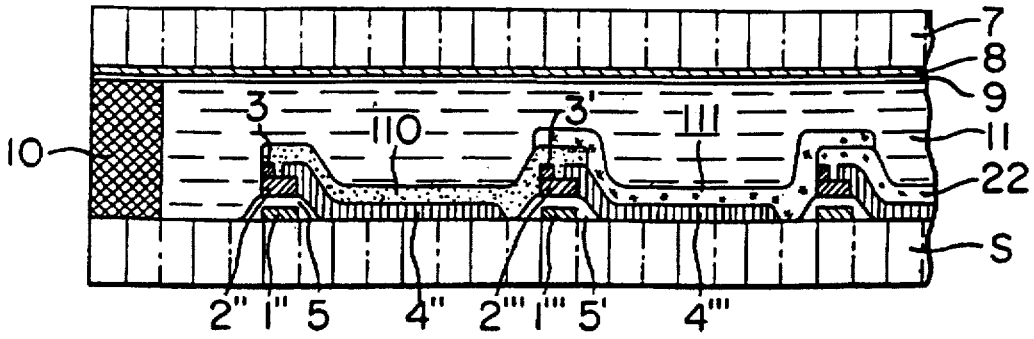
FIG. 12 shows a cross section of FIG. 11

FIGS. 11 and 12 illustrate embodiments of the present invention. FIG. 11 shows that optical filters of organic color substances are placed on an electrode matrix to form a thin-film of a semi-conductor as shown on FIG. 9B, overlapping each other at their adjacent edges. FIG. 12 also shows another embodiment composed of an arrangement similar to that of FIG. 10.

The same numerals appearing on FIGS. 9B and 10 indicate the same elements respectively. FIG. 11 shows a matrix formed by gate lines 1a, 1a', 1a", . . . , and source lines 3, 3', 3". There are TFT shown by the numerals of 2, 2', 2", 2'" and are formed with membranes of organic color substances, which are optical filters 110, 111, 112 thereover. Organic color substances 110, 111, 112 possess difference spectral properties respectively and are placed in overlapping relation to each other at their adjacent edges. FIG. 12 illustrates that a membrane 110 of organic color substance and 111 of different organic color substance overlap each other over semi-conductor 2'" on the gate line.

In FIG. 11, these overlapping parts are composed of three kinds of membranes 110, 111 and 112 of organic color substances, which work for color filter corresponding to the elemental electrodes 4, 4" thereunder. Accordingly, where the additive process is employed in color display, three primary colors of blue (B), green (G) and red (R) are used for 110, 111 and 112 respectively, while cyan (C), magenta (M) and yellow (Y) are used for the subtractive process. Generally, these three colors may be adopted as color units for color display. Under the constructions described above, since an optical filter is formed attached to an electrode in display, the advantage of mitigating parallax is obtained. Furthermore, in the present invention, since adjacent filters are placed so as to overlap each other, the large absorption effect will be obtained against an incident light from the surface of the semiconductor. Especially in the additive process, overlapping of three primaries R, G and B causes a black color which results in higher shade effect. And other advantages resulting from use of such a membrane as an optical filter are as follows: the membranes may be easily formed by sublimation transfer with heating or vacuum evaporation, and colorants may be selected from various types of organic colored substance which are known as organic dyes. Most preferably an organic color substance may be selected from organic pigments which are well known. In this case, since surfaces of the electrode, and semi-conductor can be covered at least by one layer, and by two layers of overlapping portions, these electrodes may not directly contact with the optical electric transfer elements such as the liquid crystal, or the like and results in effects for protecting against electrical dissolving of the liquid crystal, and electrical short circuits against another pole by way of impurities therein.

This is because those pigments are chemically stable and have an excellent electric resistance to be used as protector.

Further advantages resulted from the overlapping parts above, are possible protection for unnecessary reflection for display by covering circuit parts of gate lines, source lines, etc. with a shield in high density to improve apparent contrast. That is to say, the black or dark parts produced by overlapping layers produce an effect for easily distinguishing optical changes in display against a background.

Figure 13A:
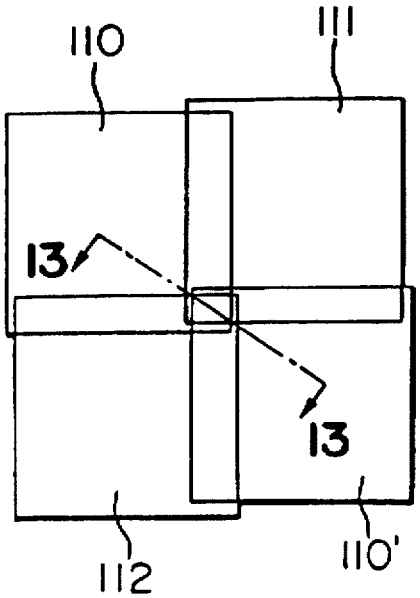
FIG. 13A shows a plan for an embodiment of disposition of organic colored film.
Figure 13B:
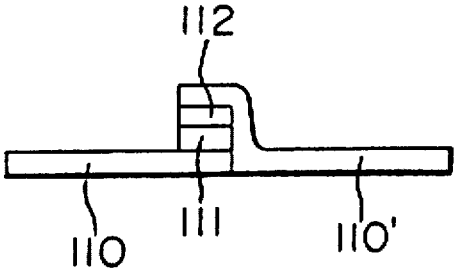
FIG. 13B shows partial cross-section of FIG. 13A.
Figure 13C:
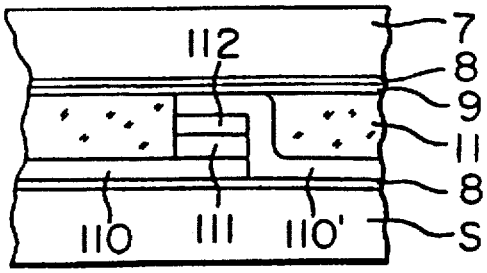
FIG. 13C shows partial cross-section of a display device composed of FIG. 13B above.

FIGS. 13A to 13C illustrate an embodiment where the present invention is utilized as a spacer between the opposed substrates.

FIG. 13A shows a disposition in which four layers of membranes 110, 111, 112 and 110' of organic color substances are overlapped at their adjacent edges.

FIG. 13B is a cross section of B—B line in FIG. 13A and FIG. 13C shows the overlapped parts of FIG. 13B maintaining a space to hold liquid crystal between substrates 7 and S. Where these overlapped parts will be positioned over the semiconductors, a distance of a spacer may be determined by the difference between a thickness of a display part and of semiconductor together with constituent members forming the circuit. For better understanding, FIG. 13C exemplifies the case in which a semiconductor part is not used. With reference to FIG. 13C, where the organic color substrates will be 1.5 μm in thickness and other layers have equal thickness respectively, as it is clear from the drawing, displayable parts in membrane 110 and 110' may be obtained at a space of three times that of the individual layers; i.e. 1.5 μm×3=4.5 μm. A thickness of a layer of one color filter is usually approximately 0.1 μm–3 μm, and preferably approximately 0.5 μm–1.5 μm, and is determined so as to obtain appropriate absorption simultaneously.

The thickness of a spacer is not restricted only by the thickness of a membrane of organic color substance, and thickness of a circuit part forming a thin film may also be added. On the other hand, it may be possible to adopt the remaining thickness of a mask which is treated by photolithography or plasmaetching for patterning.

These overlapped parts of the films make it easy to manufacture a display device because conventional spacer material is not required. Furthermore, since such a construction may have many spacers around elemental electrodes, it will become possible to manufacture large scale displays with uniform thickness even with a substrate of a thin layer. As for the dyes and pigment to be used in a membrane of organic color materials, various types of materials may be selected. However, in consideration of manufacturing, sublimation material is preferred in the present invention.

Dyes and pigment to be used in the present invention may be described as follows. In the filters for the subtractive process various colors are developed with a combination of three primaries; i.e., magenta, yellow, and cyan. (1) Acceptable magenta dyes are: Rhodamine 6GCP (Basic Red 1, C.I. 45160) supplied by Sumitomo Chemical Co., Ltd., Rhodamine F4G (Basic Red 1, C.I. 45160) supplied by BASF, Phroxine G (Basic Red 12) supplied by Bay, Kayacent Red B (Solvent Red 146) supplied by Nippon Kayaku Co., Ltd., and PTR-63 supplied by Mitsubishi Kasei Co., Ltd; magenta pigment such as perylene, quinacridone, and anthraquinone, and the like. (2) Acceptable yellow dyes are: Fast Yellow G (Disperse Yellow 3, C.I. 11855) supplied by BASF, Brilliant Yellow 5G (Basic Yellow 13) supplied by Sumitomo Chemical Co., Ltd., Brilliant Yellow 5GH (Basic Yellow 13) supplied by Hodogaya Chemical Co., Ltd., Kayacet Yellow 963, supplied by Nippon Kayaku Co., Ltd., Fluoresceine (C.I. 45350) and the like; and Yellow Pigment such as flavanthrone, isoindolenone, and the like. (3) Acceptable yellow cyan dyes are: Brimocyanine BX conc (Basic Blue 1, E.I. 42025) supplied by Sumitomo Chemical Co., Ltd., Astrasone Blue B (Basic Blue 5, C.I. 42140) supplied by Bay, Aizen Basic Cyanine 6GH (Basic Blue 1, C.I. 42025) manufactured by Hodogaya Chemical Co., Ltd.; and the like. Acceptable phthalocyanine type pigment are also Copper phthalocyanine Blue.

In the filter used in the additive process various colors are developed with three primaries; i.e., blue, red and yellow. (1) Acceptable blue dyes are: Orient Soluble Blue OBC (Acid Blue 22, C.I. 42755) supplied by Orient Chemical Co., Ltd, Suminole Perylene Blue 4GL (Acid Blue 23, C.I. 61125) supplied by Sumitomo Chemical Co., Ltd., Kayanole Blue N2G (Acid Blue 40, C.I. 2125) supplied by Nihon Kagaku Co., Ltd., Mitsui Alizarine Saphirol B (Acid Blue 80, C.I. 63010) supplied by Mitsui Toatsu Chemical Co., Ltd., Xylene Fast Blue R (Acid Blue 59, C.I. 50815) supplied by Mitsubishi Kasei Co., Ltd., Alizarine Fast Blue R (Acid Blue 80, C.I. 61585), supplied by Ciba-Geigy Ltd., Carboran Brilliant Blue 2R (Acid Blue 140) supplied by I.C.I. Ltd., Palatine Fast Blue GGN (Acid Blue 158, C.I. 14880) supplied by BASF, Aizen Opal Blue New conc. (Acid Blue 192) supplied by Hodogaya Chemical Co., Ltd., Fastogen Blue SBL (Acid Blue 249, C.I. 74220) supplied by Dainihon Ink Chemical Co., Ltd., Miketon Fast Blue extra (Disperse Blue, C.I. 64500) supplied by Mitsui-Toatsu Chemicals Inc., Kayalon Fast Blue FN (Disperse Blue, C.I. 61505) supplied by Nippon Kayaku Co., Ltd., Sumikaron Blue E-BR (Disperse Blue 26) supplied by Sumitomo Chemical Co., Ltd., Terasil Blue 2R (Disperse Blue 19, C.I. 61110) supplied by Ciba-Geigy Ltd., Palanil Blue R (Disperse Blue 220) supplied by BASF, Aizen Brilliant Basic Cyanine 6GH (Basic Blue 1, C.I. 42025) supplied by Hodogaya Chemical Co., Ltd., Aizen Cathilon Blue GLH (Basic Blue 65, C.I. 11076(S)) supplied by Hodogaya Chemical Co., Ltd., Cibacent Blue F3R (Disperse Blue 3, C.I. 61505) supplied by Ciba-Geigy Ltd, Biacelliton Fast Brilliant Blue B (Disperse Blue 3, C.I. 61505) supplied by Mitsubishi Chemical Industrial Co., Ltd., Dispersol Blue BN (Disperse Blue 3, C.I. 61505) supplied by I.C.I. Ltd., Resolin Blue FBL (Disperse Blue 56) supplied by Bayer A.G., Latyl Blue FRN (Disperse Blue 3, C.I. 61505) supplied by du Pont de Nemours Co., Inc., Sevron Blue ER (Basic Blue 77) supplied by du Pont de Nemours Co., Inc., Diacryl Brilliant Blue H2R-N (Basic Blue 105(S)) supplied by Mitsubishi Chemical Industrial Co., Ltd., and the like. (2) Acceptable red dyes are: Suminol Fast Red B conc (Acid Red 6, C.I. 14680) supplied by Sumitomo Chemical Co., Ltd., Aizen Brilliant Scarlet 3RH (Acid Red 18, C.I. 16255) supplied by Hodogaya Chemical Co., Ltd., Azo Rubinol 3GS 250% (Acid Red 52, C.I. 17045) supplied by Mitsubishi Chemical Industrial Co., Ltd., Kayaku Acid Rhodamine FB (Acid Red 52, C.I. 45100) supplied by Nippon Kayaku Co., Ltd., Acid Anthracene Red 3B (Acid Red 89, C.I. 23910) supplied by Chugai Chemical Co., Ltd., Benzil Fast Red B (Acid Red 108, C.I. 18110) supplied by Ciba-Geigy Ltd., Palatine Fast Red RN (Acid Red 180, C.I. 18736) supplied by BASF, Nylomine Red 2BS (Acid Red 266) supplied by I.C.I. Ltd., Lanafast Red 2GL (Acid Red 320) supplied by Mitsui-Toatsu Chemical Inc., Rose Bengal (Acid Red 94, C.I. 45440) supplied by Kii Chemical Industry Ltd., Celliton Scarlet B (Disperse Red 1, C.I. 11,110) supplied by BASF, Diacelliton Fast Pink R (Disperse Red 4, C.I. 60755) supplied by Mitsubishi Chemical Industrial Ltd., Terasil Brilliant Pink 4BN (Disperse Red 11, C.I. 62015) supplied by Ciba-Geigy Ltd., Kayalon Red R (Disperse Red 17, C.I. 11210) supplied by Nippon Kayaku Co., Ltd., Sumikaron Red E-FBL (Disperse Red 60) supplied by Sumitomo Chemical Co., Ltd, Resolin Red FB (Disperse Red 60) supplied by Bayer AG., Sumiacryl Rhodamine 6GCP (Basic Red 1, C.I. 45160) supplied by Sumitomo Chemical Co., Ltd., Aizen Cathilon Pink FGH (Basic Red 13, C.I. 48015) supplied by Hodogaya Chemical Co., Ltd., Maxilon Brilliant Red 4G (Basic Red 14) supplied by Ciba-Geigy Ltd., Diacryl Supra Brilliant Pink R-N (Basic Red 35) supplied by Mitsubishi Chemical Industrial Ltd., and the like. (3) Acceptable green dyes are: Kayakalan Blue-Black 3BL (Acid Green 7) supplied by Nippon Kayaku Co., Ltd., Sumilan Green BL (Acid Green 12, C.I. 13425) supplied by Sumitomo Chemical Co., Ltd., Aizen Floslan Olive Green GLH (Acid Green 61) supplied by Hodogaya Chemical Co., Ltd., Diacid Cyanine Green GWA (Acid Green 44, C.I. 61590) supplied by Mitsubishi Chemical Industrial Ltd., Cibalan Green GL (Acid Green 43) supplied by Giba-Geigy Ltd., Carbonal Brilliant Green 5G (Acid Green 28), supplied by I.C.I. Ltd., Palatine Fast Green BLN (Acid Green 12) supplied by BASF, Acid Green GBH (Acid Green 3) supplied by Takaoka Chemical Co., Ltd., Acid Brilliant Milling Green B (Acid Green 9, C.I. 42100) supplied by Mitsui-Toatsu Chemical Inc., Aizen Diamond Green GH (Basic Green, C.I. 42040) supplied by Hodogaya Chemical Co., Ltd., Aizen Malachite Green (Basic Green 4, C.I. 42000) supplied by Hodogaya Chemical Co., Ltd., Brilliant Green (Basic Green 1, C.I. 42040) supplied by E. I. du Pont de Nemours Co., Ltd., Fast Green JJO (Basic Green 1, C.I. 42040) supplied by Ciba-Geigy Ltd., Synacril Green G (Basic Green 4, C.I. 42000) supplied by I.C.I. Ltd., Victoria Green (Basic Green 4, C.I. 42000) supplied by E. I. du Pont de Nemours Co., Inc., and the like.

These dyes or pigments are formed into masks corresponding to a segment pattern or into patterns with respective display pattern elements by selective heating or the like. Alternately, it is formed into appropriate patterns as shown on the aforementioned drawings by the step such as photolithography after uniformly applying film by vacuum evaporation.

In the present invention, it is possible that a conductive surface insulated and separated from gate lines is formed on a substrate forming gate lines of thin film transistors. In this structure, the conductive surface may be a counter electrode of a capacitor for storing charge.

Figure 17:
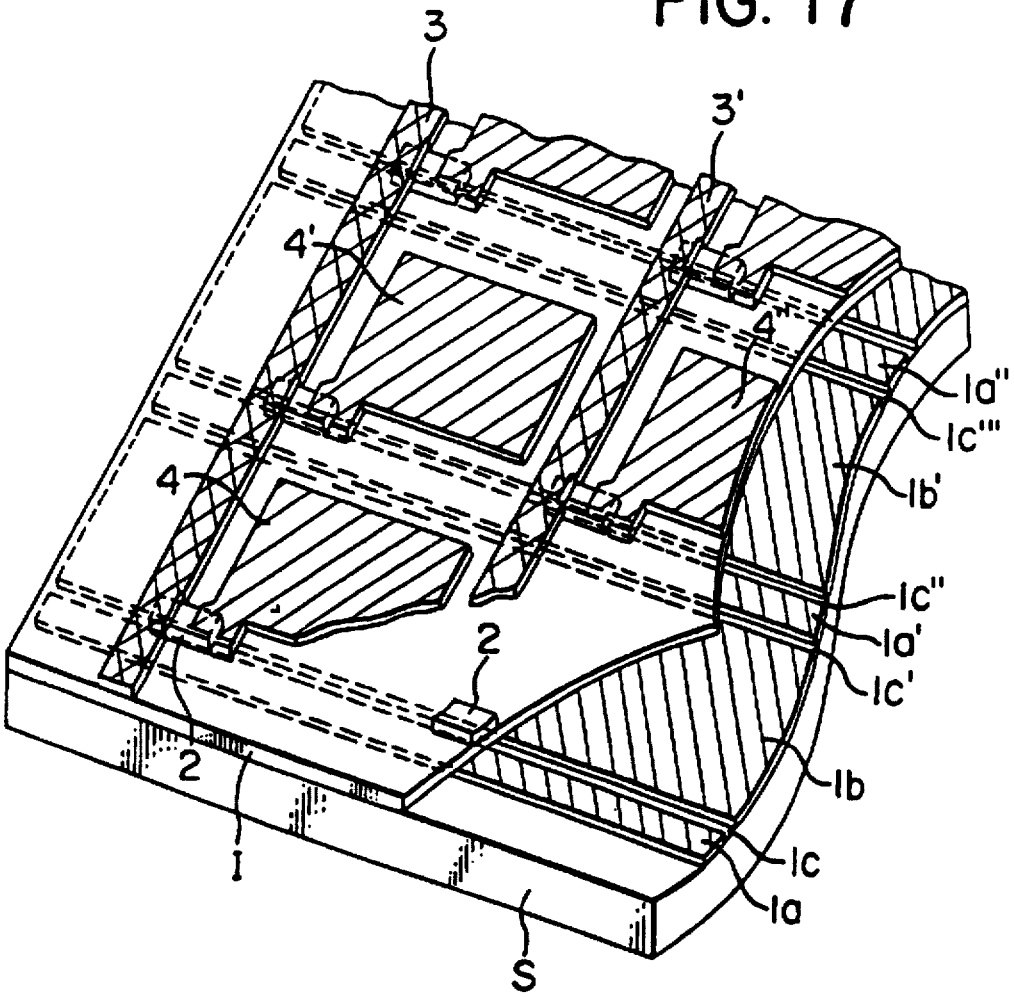
FIG. 17 shows perspective view of an electrode substrate of a display illustrated in an embodiment of the present invention.
Figure 18:
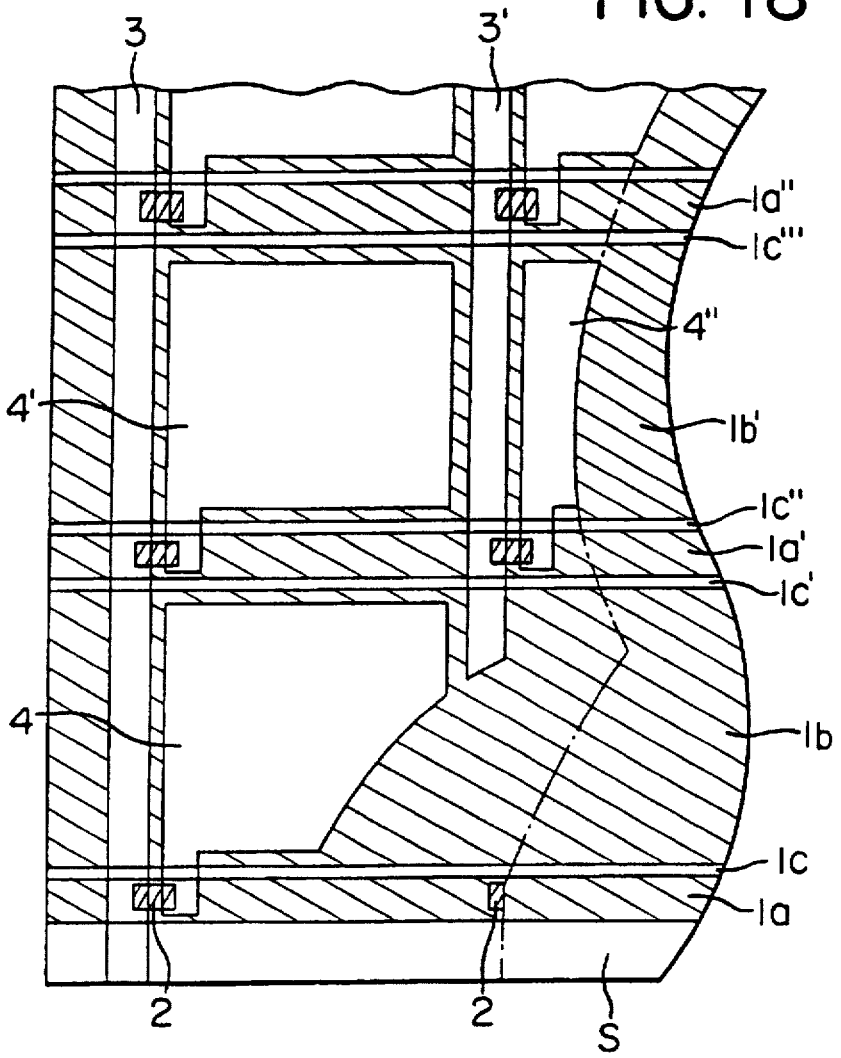
FIG. 18 shows a plan of the electrode substrate in FIG. 17.

By reference to the drawings, such embodiment will be described below in detail. FIGS. 17 and 18 are drawings showing a structure of a display electrode substrate used in a display apparatus of an embodiment according to the present invention. Portions having the same function as those of the foregoing drawings are represented by the same symbols. Reference character S represents an insulating substrate of a transparent material such as glass. On substrate S are formed plural gate lines 1a, 1a', 1a" . . . in parallel separated by a predetermined gap. On substrate S, conductive films 1b, 1b', . . . of stripes are formed in parallel. The conductive films are separated from gate lines 1a, 1a', 1a" . . . at intervals of predetermined gaps 1c, 1c', 1c", 1c'", . . . . Insulating layer I is formed on gate lines 1a, 1a', 1a" . . . and conductive film 1b, 1b' . . . . Semiconductors 2 of a thin film made of CdS, CdSe, and the like are formed at predetermined positions on the insulating layer. Semiconductors 2 form a thin film transistor array constructing a driving switching element. Semiconductors 2 are regularly arranged in a matrix at intervals of predetermined gaps positioning above gate lines 1a, 1a', 1a" . . . . Source lines 3, 3' . . . are formed at one end (left side of the semiconductors, in FIG. 17) of the corresponding semiconductors in ohmic contact therewith. Source lines are aligned in common with semiconductors 2. In other words, source lines 3, 3' . . . are formed in parallel in the direction intersecting perpendicularly to gate lines 1a, 1a', 1a' . . . . Semiconductors 2 are arranged at crossing portions of source lines 3, 3', . . . and gate lines 1a, 1a', 1a" . . . . Rectangular drain electrodes 4, 4', 4" are formed in portions bounded by source lines 3, 3' . . . and gate lines 1a, 1a', 1a" . . . . A part of each drain electrode is expanded to form an ohmic contact with the other end (right end of a semiconductor in FIG. 17) of the corresponding semiconductor 2. Drain electrodes 4, 4', 4" . . . are drain portions of thin film transistors constructed by semiconductors 2, and used as display electrodes. Consequently, in the case of constructing a transmission display apparatus, the drain electrodes are made of transparent conductive film such as $In_2O_3$, $SnO_2$, or the like. In the case of forming a display apparatus of reflection type, the drain electrodes are made of a thin film of metal such as Au, Al, Pd, and the like.

Figure 19:
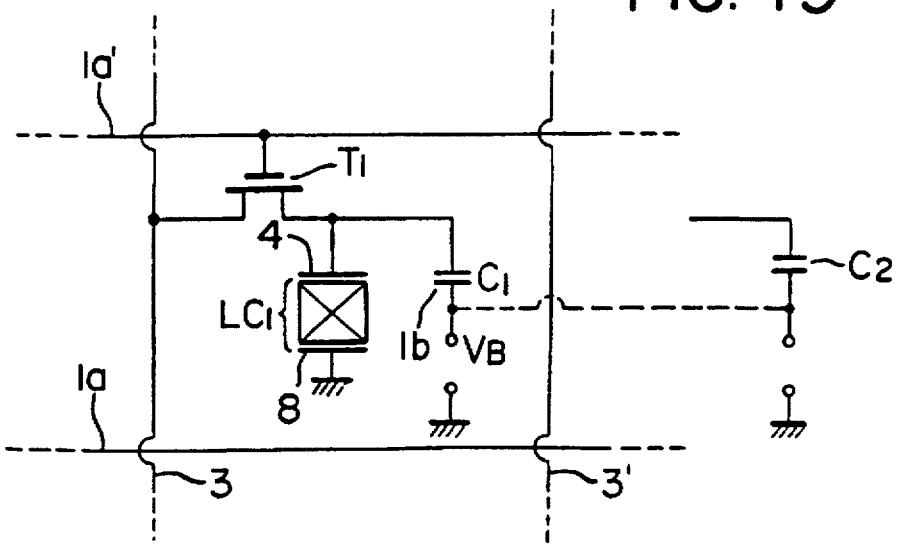
FIG. 19 illustrates a circuit diagram of a display in which the electrode substrate in FIG. 17 is utilized.

In the display electrode substrate having such structure, gate lines 1a, 1a', 1a" . . . and conductive films 1b, 1b' . . . separated from gate lines are arranged in opposition to drain electrodes 4, 4', 4" . . . through insulating layer I. These then constitute capacitors for storing driving charge. FIG. 19 shows the equivalent circuit of the display apparatus constructed by using the above-mentioned display electrode substrates and sandwiching liquid crystal between counter electrode substrates. In FIG. 19, T1 represents a field effect transistor formed at crossing portion of gate line 1a and source line 3. Display medium LC1 (in this case, liquid crystal) is sandwiched between a drain electrode 4 of transistor T1 and a grounded counter electrode 8.

C1 represents a capacitor formed by a drain electrode and the conductive film 1b. As shown in FIG. 19, capacitor C1 is independent of gate lines 1a and 1a'.

In other words, conductive films 1b, 1b' . . . being counter electrodes of capacitors can be electrically allowed to operate independently of gate lines 1a, 1a', 1a". As a result, voltage of the counter electrode of the capacitor can be set without taking the signal of the gate line into consideration. In this regard, this display apparatus of the invention is different from conventional display apparatus. A most simple embodiment of setting voltage of the counter electrode of the capacitor is a case where the counter electrode of the capacitor is set to ground potential. In this case, terminal $V_B$ of conductive film 1b is connected with the lower ground potential. If such connection is carried out, charge stored in capacitor C1 is not affected by a voltage on gate lines 1a and 1a'. Therefore, it is easy to control exactly the operating voltage and to always effect stable display independent of the voltage on gate lines 1a and 1a'.

Another embodiment setting potential of the counter electrode of the capacitor is a manner in which a predetermined bias voltage is applied on terminal $V_B$. In this case, charge stored in capacitor C1 is not affected by the voltage on gate lines 1a and 1a'. Therefore, it is, of course, possible to obtain the same effect as that obtained in the above-mentioned case. And, in this case, when an electro-optic element, such as a liquid crystal, having constant threshold characteristics is used, voltage of a writing input signal can be set low to the amount corresponding to bias voltage by applying bias voltage to the element, which is slightly lower than a threshold voltage. And, when structure of a display apparatus is formed in such a manner that the bias voltage can be selectively changed by an outside operation, the voltage operation point of the electro-optic characteristics of the liquid crystal can be changed toward the same writing input signal. This means that brightness can be controlled at a portion where the operation point changes linearly, and that contrast characteristics can be controlled at another portion where the operation point changes non-linearly. Further, when display means such as a liquid crystal is used, in which electro-optic characteristic changes in response to change of temperature, stable display can always be carried out against change of temperature in such a way that a temperature compensation voltage is supplied as the bias voltage.

As described above, an apparatus according to the present invention, in practice, gives very useful effects in circuit operation. Further the apparatus has the advantage that no complication is added to a process for manufacturing the apparatus in comparison with a process for manufacturing a conventional apparatus, since stripe counter electrodes 1b, 1b' . . . of capacitors are formed on the same insulating substrate S as that on which gate lines 1a, 1a', 1a" . . . are formed. Therefore, the counter electrodes can be formed simultaneously with forming the gate lines. For an example, steps preparing them will be described below. An insulating film is formed on the whole display area on the surface of the insulating substrate S such as glass, or the like. When a display apparatus of the reflection type is prepared, the insulating film is made of film of metal of Al, or the like. When a display apparatus of the transmission type is prepared, the insulating film is made of transparent conductive film such as $In_2O_3$, or the like. Thereafter, predetermined gaps 1c, 1c', 1c", 1c'" . . . which are required for insulating separation are removed from the conductive film by a process such as photolithography, or the like. The following steps are the same as those in a conventional process. In other words, insulating layer I is formed of $SiO_2$, $Al_2O_3$, $Si_3N_4$, or the like on whole surface of the gate lines, the counter electrodes, and the gaps. And, semiconductors 2 are formed at predetermined positions on the insulating layer. Source lines 3, 3' . . . are formed in ohmic contact with one end of each or the semiconductors, and one part of each of drain electrodes 4, 4', 4" . . . in contact with one end of each of the semiconductors. When a display apparatus of the reflection type is prepared, source lines 3, 3' . . . and drain electrodes are made of a film of metal such as Al, or the like, in the same manner as described for the conductive film mentioned above. As the semiconductor SC, CdS, CdSe, Te, amorphous silicone, or the like is used. If necessary, a non-active film or an intercepting film for a semiconductor portion is formed on semiconductors 2. Liquid crystal is sandwiched between the thus prepared display electrode substrate and a counter electrode substrate through a spacer, and the circumference of the liquid crystal is sealed to obtain a display apparatus.

Figure 20:
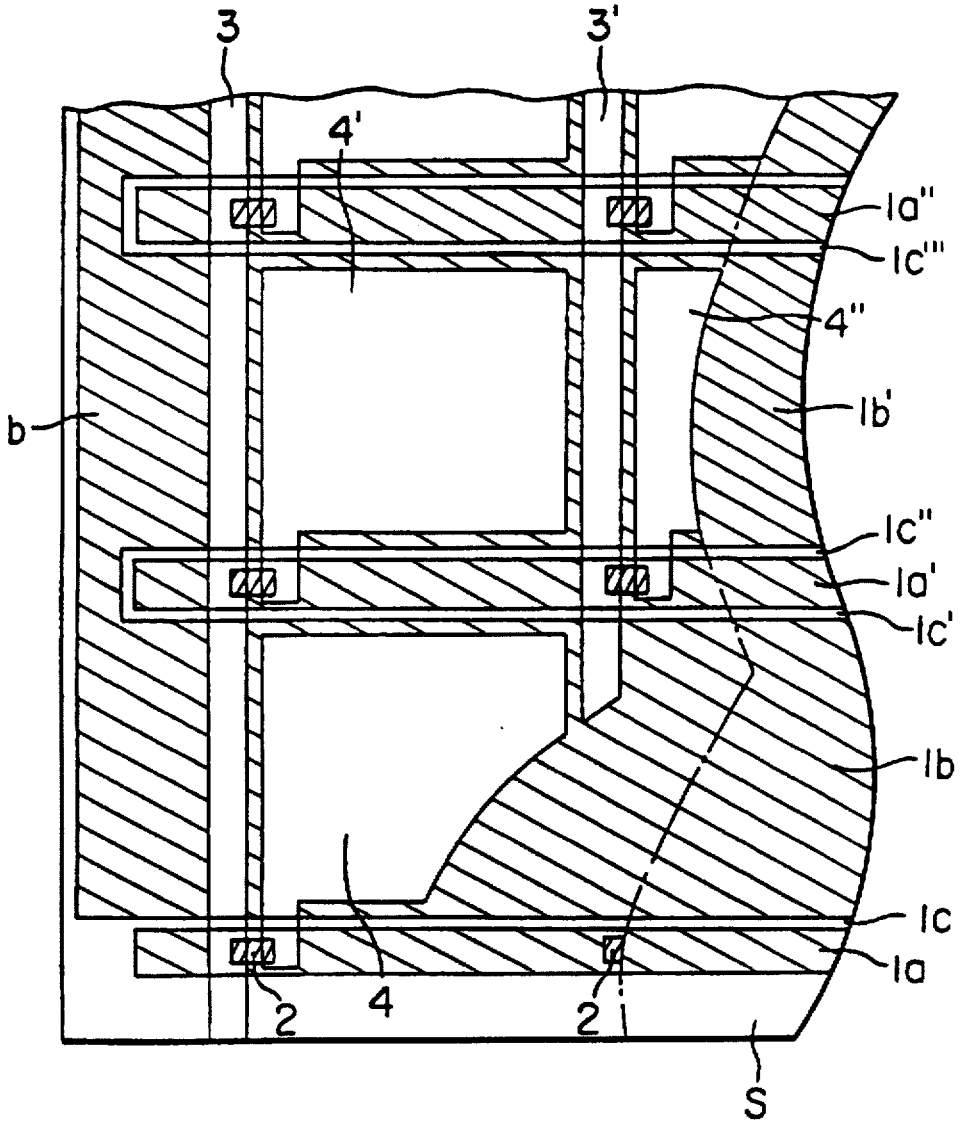
FIG. 20 shows a plan of another embodiment of an electrode substrate of a display.

In the apparatus of the above-mentioned embodiment, each of the stripes of conductive film 1b and 1b' which are used as counter electrodes of capacitors is connected with regard to each of drain electrodes 4, or 4' and 4" to be juxtaposed in the transistor array, while 1b and 1b' are not connected to each other electrically. Therefore, for applying voltage to counter electrodes of capacitors, it is required to connect electrically conductive films 1b and 1b' to each other outside of the display apparatus. However, the present invention is not restricted to the apparatus of the above-mentioned embodiment. The construction illustrated in FIG. 20 is possible. In other words, common connecting portion 6b is formed in the direction intersecting perpendicularly conductive films 1b and 1b' in a portion beyond a display region on the above-mentioned substrate S to connect with each of the conductive films 1b' and 1b" in common. In this structure, it is not required to connect each of conductive films 1b' and 1b" in common outside of the display apparatus. Therefore it is possible to reduce the number of terminals for connecting the circuit outside of the display portion.

In the apparatus of the above-mentioned embodiment, semiconductor 2 is set separately at each transistor. However it is possible to construct a transistor by using an integrated semiconductor. In this case, it is required to consider sufficiently the effects to the capacitors, since a semiconductor layer is present between drain electrodes and counter electrodes of capacitors.

In the apparatus of the above-mentioned embodiments, liquid crystal is used as display means for electro-optic change. As such display medium, liquid crystal is most usual. However, display means which can be used in the present invention are not restricted to liquid crystal. For example, a similar display apparatus may be constructed by using EC (electro-chromism). Usable display media are restricted by characteristics of thin film transistors. It is expected that types of usable display media will increase as progress in improving the characteristics of thin film transistor increases. In other words, a display medium may be used that is capable of converting electrical change to chemical change.

Effects obtained by the present invention will be summarized below.

1. There is no lowering of visibility of the display, which results from unnecessary mirror surface reflection.

2. High durability and operation by lower voltage is possible by using liquid crystal of field effect type.

3. Color display is possible by using any dye.

4. Brilliant display being easy to see can be obtained.

5. An important part accomplishes optical effects and protecting effects for display apparatus simultaneously.

6. It is possible to use semiconductor material showing photoconductive property.

7. Since liquid crystal of field effect type shows uniform electro-optical characteristics, it is easy to obtain a display apparatus having long life.

8. The display is easy to see by using a background having uniform color such as black at a non-display portion.

9. Since a process for manufacturing TFT circuits is simple and there are few difficulties encountered in process, enhancement of yield, reproducibility, uniformity, and stability of electric characteristics may be achieved.

10. Selection of intercepting materials and of orientation processes may be made within wide latitude and, there are few restrictions as to processes for manufacturing the liquid crystal cell, and any electro-optical effect can be selected as the display effect.

11. The display is easy to see, since it is possible to cover the semiconductor region, gate electrode region, and non-display region of the source electrode region.

12. While a display apparatus is constructed by a complicated semiconductor circuit, it can be prepared by very few steps for patterning.

13. There are very great effects to stable operation, since steps for preparing the transistor circuit are carried out by steps which are subject to little contamination with impurities.

14. It is possible by such construction to select any of the noted materials for making the display apparatus without concern for contamination with impurities or formation of short-circuits between electrodes.

15. Spacers can be formed incrementally by overlapping layers.

16. Certain steps for preparing spacers and intercepting members can be omitted.

17. A color filter containing pigments acts also as a protecting film to avoid direct contact of electrodes with the surface of the liquid crystal.

18. An intercepting member film avoids reflection or the like of non-display member, and enhances apparent contrast.

19. Writing driving voltage can be set without taking influence of voltage change of gate lines into consideration, since counter electrodes of capacitors are separately formed from gate lines. Therefore, it is easy to control the operating voltage.

20. Stable display can be achieved without changing the display state with voltage change of gate lines. Further, since voltage of counter electrodes of capacitors can be optionally set, control of driving voltage, brightness, contrast, and the like can be achieved by setting and controlling suitably the voltage of counter electrodes of capacitors upon use of the display apparatus.

21. An apparatus according to the present invention provides very useful effects in view of the operating circuit, while it can be prepared without increasing the number of steps for preparing such apparatus since its structure is very simple.

What we claim is:

1. A display device comprising a first substrate; an array including a plurality of thin film transistors and a plurality of electrodes both provided on said first substrate and defining a display element unit; a second substrate; a counter electrode provided on said second substrate; an electro-optical material interposed between said first substrate and said second substrate; and shading means covering each of said thin film transistors, said shading means comprising a plurality of color filters each being one of a plurality of different colors and each placed over one of said electrodes, at least two of said color filters, each being a different one of the plurality of colors, overlapping one another in the region over each thin film transistor.

2. A display device according to claim 1, wherein said display element unit comprises a said color filter placed over each of said electrodes.

3. A display device according to claim 1, wherein a color filter is placed over each of said electrodes to comprise said display element unit; and wherein an insulating layer is placed on each of said thin film transistors.

4. A display device according to claim 3, wherein said insulating layer comprises a metal oxide, a metal fluoride or a silicon nitride.

5. A display device according to claim 4, wherein said insulating layer comprises a metal oxide selected from a group consisting of $SiO_2$, $Al_2O_3$, $TiO_2$, and SiO.

6. A display device according to claim 4, wherein said insulating layer comprises a metal fluoride selected from a group consisting of $MgF_2$ and $CaF_2$.

7. A display device according to claim 1, wherein said shading means comprises an organic dye or pigment.

8. A display device according to claim 7, wherein said shading means is black.

9. A display device according to claim 1, wherein said color filters comprises at least one organic color material.

10. A display device according to claim 9, wherein said organic color material is a red dye or pigment.

11. A display device according to claim 9, wherein said organic color material is a blue dye or pigment.

12. A display device according to claim 9, wherein said organic color material is a green dye or pigment.

13. A display device according to claim 9, wherein said organic color material is a magenta dye or pigment.

14. A display device according to claim 9, wherein said organic color material is a yellow dye or pigment.

15. A display device according to claim 9, wherein said organic color material is a cyan dye or pigment.

16. A display device according to claim 1, wherein said color filters comprise a combination of three colors consisting of red, green and blue.

17. A display device according to claim 1, wherein said color filters comprise a combination of three colors consisting of magenta, yellow, and cyan.

18. A display device according to claim 1, wherein said color filters are selected from the group consisting of a phthalocyanine film, a perylene film, a quinacridone film, an anthraquinone film, a flavanthrone film, or an isoindolenone film.

19. A display device according to claim 18, wherein said color filters are phthalocyanine film.

20. A display device according to claim 18, wherein said color filters are a perylene film.

21. A display device according to claim 1, wherein said thin film transistor array comprises a semiconductor having photoconductive properties.

22. A display device according to claim 21, wherein said semiconductor having photoconductive properties is amorphous silicon.

23. A display device according to claim 1, wherein at least two of said color filters have spectral characteristics that are different from each other.

24. A display device according to claim 23, wherein one of each two adjacent color filters overlaps the other at adjacent edge portions thereof.

25. A display device according to claim 24, wherein said second substrate is attached to the upper surface of the one of said color filters that overlaps other adjacent color filters.

26. A display device according to claim 1, wherein said electro-optical material is liquid crystal.

27. A display device according to claim 26, wherein said liquid crystal is nematic liquid crystal having positive dielectric anisotropy.

28. A display device according to claim 27, wherein said liquid crystal is oriented in homogeneous alignment in one direction when no voltage is applied thereto.

29. A display device according to claim 27, wherein said liquid crystal is oriented in twisted alignment when no voltage is applied thereto.

30. A display device according to claim 26, wherein said liquid crystal is nematic liquid crystal having negative dielectric anisotropy.

31. A display device according to claim 30, wherein said liquid crystal is oriented in homogeneous alignment in one direction when voltage is applied to the liquid crystal.

32. A display device according to claim 30, wherein said liquid crystal is oriented in twisted alignment when voltage is applied to the liquid crystal.

33. A display device according to claim 29, wherein an angle of said twisted alignment is about 90°.

34. A display device according to claim 1, further comprising a layer for orientation.

35. A display device according to claim 34, wherein said layer for orientation comprises a metal oxide, a metal fluoride or a silicon nitride.

36. A display device according to claim 34, wherein said layer for orientation comprises a metal oxide selected from the group consisting of $SiO_2$, $Al_2O_3$, $TiO_2$, and SiO.

37. A display device according to claim 34, wherein said layer for orientation comprises a metal fluoride selected from a group consisting of $MgF_2$ and $CaF_2$.

38. A display device according to claim 1 wherein said shoding means functions additionally as a spacer of components of said device.

39. A display device according to claim 1, wherein said plural electrodes comprising said display element unit are transparent.

40. A display device according to claim 1, wherein said plural electrodes comprising said display element unit each have a metal surface.

41. A display device comprising a first substrate; an array including a plurality of thin film transistors and a plurality of electrodes both provided on said first substrate and defining a display element unit; a second substrate; a counter electrode provided on said second substrate; an electro-optical material interposed between said first substrate and said second substrate; and a plurality of color filters each being one or a plurality of colors selected from a group consisting of blue, green, and red, each forming a layer having a thickness of approximately 0.1 μm–3 μm and each being placed over at least one of said electrodes, a plurality of said electrodes and a similar plurality of said color filters placed thereover, with at least two of said color filters being different ones of said colors, constituting a color display unit.

42. A display device according to claim 41, wherein each said color filter comprises an organic pigment film.

43. A display device according to claim 42, wherein said organic pigment film is selected from the group consisting of a phthalocyanine, a perylene, a quinacridone, an anthraquinone, a flavanthrone or an isoindolenone.

44. A display device according to claim 41, wherein each said color filter layer has a thickness of approximately 0.5 μm–1.5 μm.

45. A display device according to claim 41, wherein each said color filter comprises a layer dyed with an organic color material.

46. A display device according to claim 41, further comprising an insulating layer covering each said color filter.

47. A display device according to claim 41, wherein said display element unit comprises said color filters having a thickness of approximately 0.1 μm–3 μm placed over each of said electrodes.

48. A display device according to claim 41, wherein said thin film transistors comprise an amorphous silicon film.

49. A display device according to claim 48, wherein said amorphous silicon film is formed by a glow discharge decomposition.

50. A display device according to claim 41, wherein said thin film transistors comprise an amorphous silicon film and an $n^+$ layer amorphous silicon doped with phosphorus or arsenic.

51. A display device comprising a first electrode substrate; an array including a plurality of driving switching elements and a plurality of electrodes both provided on said first electrode substrate and defining a display element unit; a second electrode substrate; a counter electrode provided on said second electrode substrate; an electro-optical material interposed between said first electrode substrate and said second electrode substrate; and a plurality of color filters each being selected from a group consisting of blue, green, and red, each forming a layer having a thickness of approximately 0.1 μm–3 μm and each being placed over at least one of said electrode substrates, a plurality of said electrodes and a similar plurality of said color filters placed thereover, with at least two of said color filters being different ones of said colors, constituting a color display unit.

52. A display device according to claim 51, wherein each said color filter comprises an organic pigment film.

53. A display device according to claim 52, wherein said organic pigment film is selected from the group consisting of a phthalocyanine, a perylene, a quinacridone, an anthraquinone, a flavanthrone or an isoindolenone.

54. A display device according to claim 53, wherein each said color filter layer has a thickness of approximately 0.5 μm–1.5 μm.

55. A display device according to claim 51, wherein each said color filter comprises a layer dyed with an organic color material.

56. A display device according to claim 51, further comprising an insulating layer covering each said color filter.

57. A display device according to claim 51, wherein said display element unit comprises said color filters having a thickness of approximately 0.1 μm–3 μm placed over each of said electrodes.

*58. A display device comprising a first electrode substrate; an array including a plurality of thin film transistors and a plurality of electrodes both provided on said first electrode substrate and defining a display element unit; a second electrode substrate; a counter electrode provided on said second electrode substrate; an electro-optical material interposed between said first electrode substrate and said second electrode substrate; and a plurality of color filters each being selected from a group consisting of blue, green, and red, each forming a layer having a thickness of approximately 0.1 μm–3 μm and each being placed over at least one of said electrode substrates, a plurality of said electrodes and a similar plurality of said color filters placed thereover, with at least two of said color filters being different ones of said colors, constituting a color display unit, wherein said thin film transistors have source and drain regions provided with an $n^+$ layer.*

*59. A display device according to claim 58, wherein at least one of said driving switching elements comprises a thin film transistor comprising an amorphous silicon layer and having source and drain regions provided with an $n^+$ layer.*

*60. A display device according to claim 58, wherein at least one of said driving switching elements comprises a thin film transistor comprising an amorphous silicon layer and*

*having source and drain regions provided with an $n^+$ layer formed of silicon doped with phosphorus or arsenic.*

*61. A display device according to claim 58, wherein said electro-optical material is a liquid crystal.*

*62. A display device comprising a first electrode substrate; an array including a plurality of thin film transistors and a plurality of electrodes both provided on said first electrode substrate and defining a display element unit; a second electrode substrate; a counter electrode provided on said second electrode substrate; an electro-optical material interposed between said first electrode substrate and said second electrode substrate; and a plurality of color filters each being selected from a group consisting of blue, green, and red, each forming a layer having a thickness of approximately 0.1 μm–3 μm and each being placed over at least one of said electrode substrates, a plurality of said electrodes and a similar plurality of said color filters placed thereover, with at least two of said color filters being different ones of said colors, constituting a color display unit, wherein said thin film transistors have source and drain regions provided with an $n^+$ layer, said device further comprising means for applying a voltage to said electro-optical material, the voltage being changeable corresponding to a desired gradation.*

*63. A display device according to claim 62, wherein said electro-optical material is a liquid crystal.*

*64. A display device comprising a first electrode substrate; an array including a plurality of thin film transistors and a plurality of electrodes both provided on said first electrode substrate and defining a display element unit; a second electrode substrate; a counter electrode provided on said second electrode substrate; an electro-optical material interposed between said first electrode substrate and said second electrode substrate; and a plurality of color filters each being selected from a group consisting of blue, green, and red, each forming a layer having a thickness of approximately 0.1 μm–3 μm and each being placed over at least one of said electrode substrates, a plurality of said electrodes and a similar plurality of said color filters placed thereover, with at least two of said color filters being different ones of said colors, constituting a color display unit, wherein said thin film transistors comprise an amorphous silicon layer and having source and drain regions provided with an $n^+$ layer formed of silicon doped with phosphorus or arsenic, said device further comprising means for applying a voltage to said electro-optical material, the voltage being changeable corresponding to a desired gradation.*

*65. A display device according to claim 64, wherein said electro-optical material is a liquid crystal.*

*66. A display device comprising a first electrode substrate; an array including a plurality of thin film transistors and a plurality of electrodes both provided on said first electrode substrate and defining a display element unit; a second electrode substrate; a counter electrode provided on said second electrode substrate; an electro-optical material interposed between said first electrode substrate and said second electrode substrate; and a plurality of color filters each being selected from a group consisting of blue, green, and red, each forming a layer having a thickness of approximately 0.1 μm–3 μm and each being placed over at least one of said electrode substrates, a plurality of said electrodes and a similar plurality of said color filters placed thereover, with at least two of said color filters being different ones of said colors, constituting a color display unit, wherein said device further comprises light-intercepting film means for intercepting rays of light that would otherwise be incident on a non-display area formed between adjacent color filters.*

*67. A display device according to claim 66, wherein said electro-optical material is a liquid crystal.*

*68. A display device comprising a first electrode substrate; an array including a plurality of thin film transistors and a plurality of electrodes both provided on said first electrode substrate and defining a display element unit; a second electrode substrate; a counter electrode provided on said second electrode substrate; an electro-optical material interposed between said first electrode substrate and said second electrode substrate; and a plurality of color filters each being selected from a group consisting of blue, green, and red, each forming a layer having a thickness of approximately 0.1 μm–3 μm and each being placed over at least one of said electrode substrates, a plurality of said electrodes and a similar plurality of said color filters placed thereover, with at least two of said color filters being different ones of said colors, constituting a color display unit, wherein said thin film transistors have source and drain regions provided with an $n^+$ layer, said device further comprising light intercepting film means for intercepting rays of light that would otherwise be incident on a non-display area formed between adjacent color filters.*

*69. A display device according to claim 68, wherein said electro-optical material is a liquid crystal.*

*70. A display device comprising a first electrode substrate; an array including a plurality of thin film transistors and a plurality of electrodes both provided on said first electrode substrate and defining a display element unit; a second electrode substrate; a counter electrode provided on said second electrode substrate; an electro-optical material interposed between said first electrode substrate and said second electrode substrate; and a plurality of color filters each being selected from a group consisting of blue, green, and red, each forming a layer having a thickness of approximately 0.1 μm–3 μm and each being placed over at least one of said electrode substrates, a plurality of said electrodes and a similar plurality of said color filters placed thereover, with at least two of said color filters being different ones of said colors, constituting a color display unit, wherein said thin film transistors have source and drain regions provided with an $n^+$ layer, said device further comprising means for applying a voltage to said electro-optical material, the voltage being changeable corresponding to a desired gradation, and light-intercepting means for intercepting rays of light that would otherwise be incident on a non-display area formed between adjacent filters.*

*71. A display device according to claim 70, wherein said electro-optical material is a liquid crystal.*

*72. A display device comprising a first substrate; an array including a plurality of thin film transistors and a plurality of electrodes both provided on said first substrate and defining a display element unit; a second substrate; a counter electrode provided on said second substrate; an electro-optical material interposed between said first substrate and said second substrate; and a plurality of color filters each being one of a plurality of colors selected from a group consisting of blue, green, and red, each forming a layer having a thickness of approximately 0.1 μm–3 μm and each being placed over at least one of said electrodes, with said electrodes being between said first substrate and said color filters, a plurality of said electrodes and a similar plurality of said color filters placed thereover, with at least two of said color filters being different ones of said colors, constituting a color display unit.*

*73. A display device according to claim 72, wherein said color filters and said electro-optical material are on a same side of said electrodes.*

*74. A display device according to claim 72, wherein said color filters and said counter electrode are on a same side of said electrodes.*

*75. A display device according to claim 72, wherein said color filters, said counter electrode, and said electro-optical material are each on a same side of said electrodes.*

*76. A display device according to claim 72, wherein said color filters are between said first substrate and said second substrate.*

*77. A display device according to claim 72, wherein said electro-optical material and said counter electrode are on a same side of said electrodes.*

*78. A display device according to claim 72, wherein each said color filter comprises an organic pigment film.*

*79. A display device according to claim 78, wherein said organic pigment film is selected from the group consisting of a phthalocyanine, a perylene, a quinacridone, an anthraquinone, a flavanthrone or an isoindolenone.*

*80. A display device according to claim 72, wherein each said color filter comprises a layer dyed with an organic color material.*

*81. A display device according to claim 72, further comprising an insulating layer covering each said color filter.*

*82. A display device according to claim 72, wherein said thin film transistors comprise an amorphous silicon film.*

*83. A display device according to claim 82, wherein said amorphous silicon film is formed by a glow discharge decomposition.*

*84. A display device according to claim 72, wherein said thin film transistors comprise an amorphous silicon film and an $n^+$ layer amorphous silicon doped with phosphorus or arsenic.*

*85. A display device comprising a first substrate; an array including a plurality of thin film transistors and a plurality of electrodes both provided on said first substrate and defining a display element unit; a second substrate; a counter electrode provided on said second substrate; an electro-optical material interposed between said first substrate and said second substrate; and a plurality of color filters each being one of a plurality of colors selected from a group consisting of blue, green, and red, each forming a layer having a thickness of approximately 0.1 μm–3 μm and each being placed between said first substrate and said second substrate over at least one of said electrodes, a plurality of said electrodes and a similar plurality of said color filters placed thereover, with at least two of said color filters being different ones of said colors, constituting a color display unit.*

*86. A display device according to claim 85, wherein said color filters and said counter electrode are on a same side of said electrodes.*

*87. A display device according to claim 85, wherein said color filters and said electro-optical material are on a same side of said electrodes.*

*88. A display device according to claim 85, wherein said color filters, said electro-optical material, and said counter electrode are each on a same side of said electrodes.*

*89. A display device according to claim 85, wherein said electro-optical material and said counter electrode are on a same side of said electrodes.*

*90. A display device according to claim 85, wherein each said color filter comprises an organic pigment film.*

*91. A display device according to claim 90, wherein said organic pigment film is selected from the group consisting of a phthalocyanine, a perylene, a quinacridone, an anthraquinone, a flavanthrone or an isoindolenone.*

*92. A display device according to claim 85, wherein each said color filter comprises a layer dyed with an organic color material.*

*93. A display device according to claim 85, further comprising an insulating layer covering each said color filter.*

*94. A display device according to claim 85, wherein said thin film transistors comprise an amorphous silicon film.*

*95. A display device according to claim 94, wherein said amorphous silicon film is formed by a glow discharge decomposition.*

*96. A display device according to claim 85, wherein said thin film transistors comprise an amorphous silicon film and an $n^+$ layer amorphous silicon doped with phosphorus or arsenic.*

*97. A display device comprising a first substrate; an array including a plurality of thin film transistors and a plurality of electrodes both provided on said first substrate and defining a display element unit; a second substrate; a counter electrode provided on said second substrate; an electro-optical material interposed between said first substrate and said second substrate; and a plurality of color filters each being one of a plurality of colors selected from a group consisting of blue, green, and red, each forming a layer having a thickness of approximately 0.1 μm–3 μm and each being placed over at least one of said electrodes, said color filters and said counter electrode being on a same side of said electrodes, a plurality of said electrodes and a similar plurality of said color filters placed thereover, with at least two of said color filters being different ones of said colors, constituting a color display unit.*

*98. The display device according to claim 97, wherein said electro-optical material is on the same side of said electrodes as said color filters and said counter electrode.*

*99. A display device according to claim 97, wherein each said color filter comprises an organic pigment film.*

*100. A display device according to claim 99, wherein said organic pigment film is selected from the group consisting of a phthalocyanine, a perylene, a quinacridone, an anthraquinone, a flavanthrone or an isoindolenone.*

*101. A display device according to claim 97, wherein each said color filter comprises a layer dyed with an organic color material.*

*102. A display device according to claim 97, further comprising an insulating layer covering each said color filter.*

*103. A display device according to claim 97, wherein said thin film transistors comprise an amorphous silicon film.*

*104. A display device according to claim 103, wherein said amorphous silicon film is formed by a glow discharge decomposition.*

*105. A display device according to claim 97, wherein said thin film transistors comprise an amorphous silicon film and an $n^+$ layer amorphous silicon doped with phosphorus or arsenic.*

*106. A display device comprising a first substrate; an array including a plurality of thin film transistors and a plurality of electrodes both provided on said first substrate and defining a display element unit; a second substrate; a counter electrode provided on said second substrate; an electro-optical material interposed between said first substrate and said second substrate; and a plurality of color filters each being one of a plurality of colors selected from a group consisting of blue, green, and red, each forming a layer having a thickness of approximately 0.1 μm–3 μm and each being placed over at least one of said electrodes, said color filters and said electro-optical material being on a*

*same side of said electrodes, a plurality of said electrodes and a similar plurality of said color filters placed thereover, with at least two of said color filters being different ones of said colors, constituting a color display unit.*

*107. The display device according to claim 106, wherein said counter electrode is on the same side of said electrodes as said color filters and said electro-optical material.*

*108. A display device according to claim 106, wherein each said color filter comprises an organic pigment film.*

*109. A display device according to claim 108, wherein said organic pigment film is selected from the group consisting of a phthalocyanine, a perylene, a quinacridone, an anthraquinone, a flavanthrone or an isoindolenone.*

*110. A display device according to claim 106, wherein each said color filter comprises a layer dyed with an organic color material.*

*111. A display device according to claim 106, further comprising an insulating layer covering each said color filter.*

*112. A display device according to claim 106, wherein said thin film transistors comprise an amorphous silicon film.*

*113. A display device according to claim 112, wherein said amorphous silicon film is formed by a glow discharge decomposition.*

*114. A display device according to claim 106, wherein said thin film transistors comprise an amorphous silicon film and an $n^+$ layer amorphous silicon doped with phosphorus or arsenic.*

*115. A display device comprising a first substrate; an array including a plurality of thin film transistors and a plurality of electrodes both provided on said first substrate and defining a display element unit; a second substrate; a counter electrode provided on said second substrate; an electro-optical material interposed between said first substrate and said second substrate, said counter electrode and said electro-optical material being on a same side of said electrodes; and a plurality of color filters each being one of a plurality of colors selected from a group consisting of blue, green, and red, each forming a layer having a thickness of approximately 0.1 μm–3 μm and each being placed over at least one of said electrodes, a plurality of said electrodes and a similar plurality of said color filters placed thereover, with at least two of said color filters being different ones of said colors, constituting a color display unit.*

*116. The display device according to claim 115, wherein said color filters are on the same side of said electrodes as said counter electrode and said electro-optical material.*

*117. A display device according to claim 115, wherein each said color filter comprises an organic pigment film.*

*118. A display device according to claim 117, wherein said organic pigment film is selected from the group consisting of a phthalocyanine, a perylene, a quinacridone, an anthraquinone, a flavanthrone or an isoindolenone.*

*119. A display device according to claim 115, wherein each said color filter comprises a layer dyed with an organic color material.*

*120. A display device according to claim 115, further comprising an insulating layer covering each said color filter.*

*121. A display device according to claim 115, wherein said thin film transistors comprise an amorphous silicon film.*

*122. A display device according to claim 117, wherein said amorphous silicon film is formed by a glow discharge decomposition.*

*123. A display device according to claim 115, wherein said thin film transistors comprise an amorphous silicon film and an $n^+$ layer amorphous silicon doped with phosphorus or arsenic.*

* * * * *